United States Patent
Xu

(10) Patent No.: US 10,361,823 B2
(45) Date of Patent: Jul. 23, 2019

(54) METHOD AND APPARATUS FOR TRANSMITTING UPLINK DATA IN LICENSED-ASSISTED ACCESS SYSTEM

(71) Applicant: Huawei Technologies Co., Ltd., Shenzhen (CN)

(72) Inventor: Kai Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/566,934

(22) PCT Filed: May 15, 2015

(86) PCT No.: PCT/CN2015/079010
§ 371 (c)(1),
(2) Date: Oct. 16, 2017

(87) PCT Pub. No.: WO2016/183705
PCT Pub. Date: Nov. 24, 2016

(65) Prior Publication Data
US 2018/0102880 A1    Apr. 12, 2018

(51) Int. Cl.
*H04L 1/18* (2006.01)
*H04W 72/04* (2009.01)
(Continued)

(52) U.S. Cl.
CPC .......... *H04L 1/1887* (2013.01); *H04L 1/18* (2013.01); *H04L 1/1896* (2013.01);
(Continued)

(58) Field of Classification Search
None
See application file for complete search history.

(56) References Cited

U.S. PATENT DOCUMENTS

| | | | |
|---|---|---|---|
| 2014/0029552 A1 | 1/2014 | Lv et al. | |
| 2018/0020445 A1* | 1/2018 | Harada | H04J 1/00 |
| 2018/0131473 A1* | 5/2018 | Moon | H04L 1/18 |

FOREIGN PATENT DOCUMENTS

| | | |
|---|---|---|
| CN | 101325573 A | 12/2008 |
| CN | 101420292 A | 4/2009 |

(Continued)

OTHER PUBLICATIONS

"Discussion on issues related to UL transmission in LAA", 3GPP TSG RAN WG1 Meeting #80bis, Belgrade,Serbia, XP050934811 R1-151958, 3rd Generation Partnership Project, Valbonne, France (Apr. 20-24, 2015).

*Primary Examiner* — Saumit Shah
(74) *Attorney, Agent, or Firm* — Leydig, Voit & Mayer, Ltd.

(57) ABSTRACT

A method and an apparatus for transmitting uplink data in a licensed-assisted access (LAA) system are provided. The method includes: receiving mode configuration indication information sent by a network device, where the mode configuration indication information is used to indicate that a synchronous hybrid automatic repeat request (HARQ) mode and an asynchronous HARQ mode are configured for uplink transmission of user equipment on an unlicensed carrier; and performing uplink transmission on the unlicensed carrier using the synchronous HARQ mode or the asynchronous HARQ mode and according to the mode configuration indication information.

15 Claims, 7 Drawing Sheets

(51) Int. Cl.
*H04L 5/00* (2006.01)
*H04W 88/06* (2009.01)
(52) U.S. Cl.
CPC ......... *H04W 72/04* (2013.01); *H04W 72/042*
(2013.01); *H04W 72/048* (2013.01); *H04L*
*5/0055* (2013.01); *H04W 88/06* (2013.01)

(56) References Cited

FOREIGN PATENT DOCUMENTS

| | | |
|---|---|---|
| CN | 102740465 A | 10/2012 |
| CN | 103095435 A | 5/2013 |
| CN | 104540230 A | 4/2015 |
| EP | 2685772 A1 | 1/2014 |
| WO | 2013134948 A1 | 9/2013 |
| WO | 2013136316 A1 | 9/2013 |

* cited by examiner

//  METHOD AND APPARATUS FOR TRANSMITTING UPLINK DATA IN LICENSED-ASSISTED ACCESS SYSTEM

CROSS-REFERENCE TO RELATED APPLICATIONS

This application is a national stage application of International Application No. PCT/CN2015/079010, filed on May 15, 2015, which is hereby incorporated by reference in its entirety.

TECHNICAL FIELD

The present invention relates to the communications field, and more specifically, to a method and an apparatus for transmitting uplink data in a licensed-assisted access system.

BACKGROUND

In a licensed-assisted access (Licensed-Assisted Access, LAA) system, an LAA node uses a channel resource by using a listen before talk (Listen Before Talk, LBT) rule. LBT is a carrier sense multiple access (Carrier Sense Multiple Access, CSMA) technology. That is, after detecting that a channel resource of an unlicensed spectrum is idle, the LAA node uses the channel resource of the unlicensed spectrum to transmit data. The LBT includes a load based equipment (Load Based Equipment, LBE) manner and a frame based equipment (Frame Based Equipment, FBE) manner. The LBE manner means that whether to contend for a channel and duration of occupying a channel are determined based on whether data needs to be currently sent and based on a to-be-sent data volume. The FBE manner means that a channel is preempted according to a frame structure and duration of occupying a channel is fixed.

After successfully preempting a channel in the LBE or FBE manner, an LAA node (for example, user equipment or a base station) occupies the channel to send data. A time during which the LAA node occupies the channel each time should not exceed maximum occupation duration. For example, in the FBE manner, the maximum occupation duration is 10 ms, and in the LBE manner, the maximum occupation duration is 13 ms. Therefore, after occupying the channel for a period of time, the LAA node needs to release the channel, and preempts a channel resource again when needing to use a channel.

In an existing LTE system, a synchronous hybrid automatic repeat request (Hybrid Automatic Repeat Request, HARQ) mode is used for uplink transmission between user equipment and a base station. As shown in FIG. 1, in the synchronous HARQ mode, the user equipment (User Equipment, UE) transmits a data packet in a subframe n for the first time, and the base station (for example, an evolved NodeB or an eNB) feeds back acknowledgement (Acknowledgement, ACK) or non-acknowledgement (Non-acknowledgement, NACK) information to the UE in a subframe n+4. If the UE feeds back the non-acknowledgement information (NACK), the UE needs to retransmit the data packet in a subframe n+8. However, due to a limitation of maximum occupation duration on an unlicensed carrier, the UE may successfully preempt only resources of a subframe n−3 to a subframe n+7. Therefore, as shown in FIG. 1, the UE cannot retransmit the data packet within this channel occupation period. The existing HARQ retransmission mechanism is not applicable to the LAA system. Consequently, feasibility and system performance of the LAA system are relatively poor.

SUMMARY

Embodiments of the present invention provide a method and an apparatus for transmitting uplink data in an LAA system, so as to avoid a prior-art problem that UE cannot retransmit data because a time resource obtained by the UE through contention on an unlicensed carrier is limited.

According to a first aspect, a method for transmitting uplink data in an LAA system is provided, including: receiving mode configuration indication information sent by a network device, where the mode configuration indication information is used to indicate that a synchronous hybrid automatic repeat request HARQ mode and an asynchronous HARQ mode are configured for uplink transmission of user equipment on an unlicensed carrier; and performing uplink transmission on the unlicensed carrier by using the synchronous HARQ mode or the asynchronous HARQ mode and according to the mode configuration indication information.

In a first possible implementation of the first aspect, the mode configuration indication information is further used to indicate mode switching between the synchronous HARQ mode and the asynchronous HARQ mode.

With reference to the foregoing possible implementation, in a second possible implementation of the first aspect, the receiving mode configuration indication information sent by a network device includes: receiving a system message sent by the network device, where the system message carries the mode configuration indication information; or receiving radio resource control RRC signaling sent by the network device, where the RRC signaling carries the mode configuration indication information; or receiving downlink control information DCI sent by the network device, where the DCI carries the mode configuration indication information.

With reference to the foregoing possible implementations, in a third possible implementation of the first aspect, the performing uplink transmission on the unlicensed carrier by using the synchronous HARQ mode or the asynchronous HARQ mode includes: retransmitting uplink data by using the asynchronous HARQ mode when it is determined that a needed resource has not been obtained through contention, where the needed resource is a resource that is on the unlicensed carrier and that is needed when the uplink data is retransmitted according to the synchronous HARQ mode.

With reference to the foregoing possible implementations, in a fourth possible implementation of the first aspect, before the retransmitting uplink data by using the asynchronous HARQ mode, the method further includes: when it is determined that the needed resource has not been obtained through contention, determining to retransmit the uplink data by using the asynchronous HARQ mode; and sending first indication information to the network device, where the first indication information is used to indicate that the user equipment retransmits the uplink data by using the asynchronous HARQ mode.

With reference to the foregoing possible implementations, in a fifth possible implementation of the first aspect, before the retransmitting uplink data by using the asynchronous HARQ mode, the method further includes: receiving second indication information that is sent by the network device when the network device determines that the needed resource has not been obtained through contention, where the second indication information is used to instruct the user equipment to retransmit the uplink data by using the asynchronous HARQ mode; and determining, according to the second indication information, to retransmit the uplink data by using the asynchronous HARQ mode.

With reference to the foregoing possible implementations, in a sixth possible implementation of the first aspect, the second indication information is carried in downlink control information; and the second indication information includes at least one of the following fields: a HARQ mode field or a HARQ mapping field, where the HARQ mode field is used to indicate that the synchronous HARQ mode or the asynchronous HARQ mode is used, and the HARQ mapping field is used to indicate a HARQ process number corresponding to the uplink data.

With reference to the foregoing possible implementations, in a seventh possible implementation of the first aspect, that it is determined that a needed resource has not been obtained through contention includes: receiving third indication information sent by the network device, where the third indication information is used to indicate that the network device has not obtained the needed resource through contention; and determining, according to the third indication information, that the needed resource has not been obtained through contention.

With reference to the foregoing possible implementations, in an eighth possible implementation of the first aspect, the retransmitting uplink data by using the asynchronous HARQ mode when it is determined that a needed resource has not been obtained through contention includes: retransmitting the uplink data by using the asynchronous HARQ mode when it is determined that a percentage, in the needed resource, of a part that has not been obtained through contention in the needed resource exceeds a threshold; or the method further includes: retransmitting the uplink data by using the synchronous HARQ mode when it is determined that a percentage, in the needed resource, of a part that has not been obtained through contention in the needed resource is less than the threshold.

With reference to the foregoing possible implementations, in a ninth possible implementation of the first aspect, the retransmitting the uplink data by using the synchronous HARQ mode when it is determined that a percentage, in the needed resource, of a part that has not been obtained through contention in the needed resource is less than the threshold includes: when it is determined that the percentage, in the needed resource, of the part that has not been obtained through contention in the needed resource is less than the threshold, performing puncturing processing on the uplink data according to the part that has not been obtained through contention in the needed resource.

According to a second aspect, another method for transmitting uplink data in an LAA system is provided, including: determining to configure a synchronous HARQ mode and an asynchronous HARQ mode for uplink transmission of user equipment on an unlicensed carrier; and sending mode configuration indication information to the user equipment, where the mode configuration indication information is used to indicate that the synchronous HARQ mode and the asynchronous HARQ mode are configured for uplink transmission on the unlicensed carrier, so that the user equipment performs uplink transmission on the unlicensed carrier by using the synchronous HARQ mode or the asynchronous HARQ mode.

In a first possible implementation of the second aspect, the mode configuration indication information is further used to indicate mode switching between the synchronous HARQ mode and the asynchronous HARQ mode.

With reference to the foregoing possible implementation, in a second possible implementation of the second aspect, the sending mode configuration indication information to the user equipment includes: sending a system message to the user equipment, where the system message carries the mode configuration indication information; or sending radio resource control RRC signaling to the user equipment, where the RRC signaling carries the mode configuration indication information; or sending downlink control information DCI to the user equipment, where the DCI carries the mode configuration indication information.

With reference to the foregoing possible implementations, in a third possible implementation of the second aspect, the method further includes: determining to receive, by using the asynchronous HARQ mode, uplink data that is retransmitted by the user equipment on the unlicensed carrier.

With reference to the foregoing possible implementations, in a fourth possible implementation of the second aspect, the determining to receive, by using the asynchronous HARQ mode, uplink data that is retransmitted by the user equipment on the unlicensed carrier includes: receiving first indication information sent by the user equipment, where the first indication information is used to indicate that the user equipment retransmits the uplink data by using the asynchronous HARQ mode; and determining, according to the first indication information, to receive, by using the asynchronous HARQ mode, the uplink data that is retransmitted by the user equipment on the unlicensed carrier.

With reference to the foregoing possible implementations, in a fifth possible implementation of the second aspect, the determining to receive, by using the asynchronous HARQ mode, uplink data that is retransmitted by the user equipment on the unlicensed carrier includes: determining, when it is determined that a needed resource has not been obtained through contention, to receive, by using the asynchronous HARQ mode, the uplink data that is retransmitted by the user equipment on the unlicensed carrier, where the needed resource is a resource that is on the unlicensed carrier and that is needed when the uplink data is retransmitted by using the synchronous HARQ mode; and the method further includes: sending second indication information to the user equipment, where the second indication information is used to instruct to retransmit the uplink data by using the asynchronous HARQ mode.

With reference to the foregoing possible implementations, in a sixth possible implementation of the second aspect, the second indication information is carried in downlink control information; and the second indication information includes at least one of the following fields: a HARQ mode field or a HARQ mapping field, where the HARQ mode field is used to indicate the synchronous HARQ mode or the asynchronous HARQ mode, and the HARQ mapping field is used to indicate a HARQ process number.

With reference to the foregoing possible implementations, in a seventh possible implementation of the second aspect, the determining, when it is determined that a needed resource has not been obtained through contention, to receive, by using the asynchronous HARQ mode, the uplink data that is retransmitted by the user equipment on the unlicensed carrier includes: when it is determined that a percentage, in the needed resource, of a part that has not been obtained through contention in the needed resource exceeds a threshold, determining to receive, by using the asynchronous HARQ mode, the uplink data that is retransmitted by the user equipment on the unlicensed carrier; or the method further includes: when it is determined that a percentage, in the needed resource, of a part that has not been obtained through contention in the needed resource is less than the threshold, determining to receive, by using the synchronous HARQ mode, the uplink data that is retransmitted by the user equipment on the unlicensed carrier.

According to a third aspect, another method for transmitting uplink data in an LAA system is provided, including: determining that a needed resource has not been obtained through contention, where the needed resource is a resource that is on an unlicensed carrier and that is needed when user equipment retransmits uplink data by using an uplink HARQ mode; and performing puncturing processing on the uplink data.

In a first possible implementation of the third aspect, the determining that a needed resource has not been obtained through contention includes: determining that a part of the needed resource has not been obtained through contention; the performing puncturing processing on the uplink data includes: performing puncturing processing on the uplink data according to the part that has not been obtained through contention in the needed resource; and the method further includes: retransmitting the uplink data on which the puncturing processing has been performed to a network device by using a part obtained through contention in the needed resource.

With reference to the foregoing possible implementation, in a second possible implementation of the third aspect, before the performing puncturing processing on the uplink data, the method further includes: receiving indication information sent by the network device, where the indication information is used to instruct to perform puncturing processing on the uplink data; and the performing puncturing processing on the uplink data includes: performing puncturing processing on the uplink data according to the indication information.

With reference to the foregoing possible implementations, in a third possible implementation of the third aspect, the indication information is carried in downlink control information; and the indication information includes at least one of the following fields: a carrier indicator field or a puncturing configuration field, where the carrier indicator field is used to indicate the unlicensed carrier, and the puncturing configuration field is used to indicate a starting puncturing location and a puncturing length.

According to a fourth aspect, another method for transmitting uplink data in an LAA system is provided, including: determining that a needed resource has not been obtained through contention, where the needed resource is a resource that is on an unlicensed carrier and that is needed when user equipment retransmits uplink data by using an uplink HARQ mode; and sending first indication information to the user equipment, where the first indication information is used to instruct the user equipment to perform puncturing processing on the uplink data.

In a first possible implementation of the fourth aspect, the determining that a needed resource has not been obtained through contention includes: determining that a part of the needed resource has not been obtained through contention; the first indication information is specifically used to instruct the user equipment to perform puncturing processing on the uplink data according to the part that has not been obtained through contention in the needed resource; and the method further includes: receiving the uplink data on which the puncturing processing has been performed and that is retransmitted by the user equipment by using a part obtained through contention in the needed resource.

With reference to the foregoing possible implementation, in a second possible implementation of the fourth aspect, the first indication information is carried in downlink control information; and the first indication information includes at least one of the following fields: a carrier indicator field or a puncturing configuration field, where the carrier indicator field is used to indicate the unlicensed carrier, and the puncturing configuration field is used to indicate a starting puncturing location and a puncturing length.

With reference to the foregoing possible implementations, in a third possible implementation of the fourth aspect, before the determining that a needed resource has not been obtained through contention, the method further includes: receiving second indication information sent by the user equipment, where the second indication information is used to indicate that the user equipment has not obtained the needed resource through contention; and the determining that a needed resource has not been obtained through contention includes: determining, according to the second indication information, that the needed resource has not been obtained through contention.

According to a fifth aspect, an apparatus for transmitting uplink data in an LAA system is provided, including: a receiving unit, configured to receive mode configuration indication information sent by a network device, where the mode configuration indication information is used to indicate that a synchronous HARQ mode and an asynchronous HARQ mode are configured for uplink transmission of user equipment on an unlicensed carrier; and a data transmission unit, configured to perform uplink transmission on the unlicensed carrier by using the synchronous HARQ mode or the asynchronous HARQ mode and according to the mode configuration indication information received by the receiving unit.

In a first possible implementation of the fifth aspect, the mode configuration indication information is further used to indicate mode switching between the synchronous HARQ mode and the asynchronous HARQ mode.

With reference to the foregoing possible implementation, in a second possible implementation of the fifth aspect, the receiving unit is specifically configured to: receive a system message sent by the network device, where the system message carries the mode configuration indication information; or receive RRC signaling sent by the network device, where the RRC signaling carries the mode configuration indication information; or receive DCI sent by the network device, where the DCI carries the mode configuration indication information.

With reference to the foregoing possible implementations, in a third possible implementation of the fifth aspect, the apparatus further includes a determining unit, configured to determine that a needed resource has not been obtained through contention, and the data transmission unit is specifically configured to: retransmit uplink data by using the asynchronous HARQ mode when the determining unit determines that the needed resource has not been obtained through contention, where the needed resource is a resource that is on the unlicensed carrier and that is needed when the uplink data is retransmitted according to the synchronous HARQ mode.

With reference to the foregoing possible implementations, in a fourth possible implementation of the fifth aspect, the determining unit is further configured to: when determining that the needed resource has not been obtained through contention, determine to retransmit the uplink data by using the asynchronous HARQ mode; and the apparatus further includes a sending unit, configured to send first indication information to the network device, where the first indication information is used to indicate that the user equipment retransmits the uplink data by using the asynchronous HARQ mode.

With reference to the foregoing possible implementations, in a fifth possible implementation of the fifth aspect, the receiving unit is further configured to: before the data transmission unit retransmits the uplink data by using the asynchronous HARQ mode, receive second indication information that is sent by the network device when the network device determines that the needed resource has not been obtained through contention, where the second indication information is used to instruct the user equipment to retransmit the uplink data by using the asynchronous HARQ mode; and the determining unit is further configured to determine, according to the second indication information received by the receiving unit, to retransmit the uplink data by using the asynchronous HARQ mode.

With reference to the foregoing possible implementations, in a sixth possible implementation of the fifth aspect, the second indication information is carried in downlink control information; and the second indication information includes at least one of the following fields: a HARQ mode field or a HARQ mapping field, where the HARQ mode field is used to indicate that the synchronous HARQ mode or the asynchronous HARQ mode is used, and the HARQ mapping field is used to indicate a HARQ process number corresponding to the uplink data.

With reference to the foregoing possible implementations, in a seventh possible implementation of the fifth aspect, the receiving unit is further configured to receive third indication information sent by the network device, where the third indication information is used to indicate that the network device has not obtained the needed resource through contention; and the determining unit is specifically configured to determine, according to the third indication information received by the receiving unit, that the needed resource has not been obtained through contention.

With reference to the foregoing possible implementations, in an eighth possible implementation of the fifth aspect, the determining unit is further configured to determine a percentage, in the needed resource, of a part that has not been obtained through contention in the needed resource; and the data transmission unit is specifically configured to retransmit the uplink data by using the asynchronous HARQ mode when the determining unit determines that the percentage, in the needed resource, of the part that has not been obtained through contention in the needed resource exceeds a threshold; or the data transmission unit is further configured to retransmit the uplink data by using the synchronous HARQ mode when the determining unit determines that the percentage, in the needed resource, of the part that has not been obtained through contention in the needed resource is less than the threshold.

With reference to the foregoing possible implementations, in a ninth possible implementation of the fifth aspect, the data transmission unit is specifically configured to: when the determining unit determines that the percentage, in the needed resource, of the part that has not been obtained through contention in the needed resource is less than the threshold, perform puncturing processing on the uplink data according to the part that has not been obtained through contention in the needed resource.

According to a sixth aspect, another apparatus for transmitting uplink data in an LAA system is provided, including: a determining unit, configured to determine to configure a synchronous HARQ mode and an asynchronous HARQ mode for uplink transmission of user equipment on an unlicensed carrier; and a sending unit, configured to send mode configuration indication information to the user equipment, where the mode configuration indication information is used to indicate that the determining unit determines to configure the synchronous HARQ mode and the asynchronous HARQ mode for uplink transmission on the unlicensed carrier, so that the user equipment performs uplink transmission on the unlicensed carrier by using the synchronous HARQ mode or the asynchronous HARQ mode.

In a first possible implementation of the sixth aspect, the mode configuration indication information is further used to indicate mode switching between the synchronous HARQ mode and the asynchronous HARQ mode.

With reference to the foregoing possible implementation, in a second possible implementation of the sixth aspect, the sending unit is specifically configured to: send a system message to the user equipment, where the system message carries the mode configuration indication information; or send RRC signaling to the user equipment, where the RRC signaling carries the mode configuration indication information; or send DCI to the user equipment, where the DCI carries the mode configuration indication information.

With reference to the foregoing possible implementations, in a third possible implementation of the sixth aspect, the determining unit is further configured to determine to receive, by using the asynchronous HARQ mode, uplink data that is retransmitted by the user equipment on the unlicensed carrier.

With reference to the foregoing possible implementations, in a fourth possible implementation of the sixth aspect, the apparatus further includes a receiving unit, configured to receive first indication information sent by the user equipment, where the first indication information is used to indicate that the user equipment retransmits the uplink data by using the asynchronous HARQ mode, where the determining unit is specifically configured to determine, according to the first indication information received by the receiving unit, to receive, by using the asynchronous HARQ mode, the uplink data that is retransmitted by the user equipment on the unlicensed carrier.

With reference to the foregoing possible implementations, in a fifth possible implementation of the sixth aspect, the determining unit is specifically configured to: when determining that a needed resource has not been obtained through contention, determine to receive, by using the asynchronous HARQ mode, the uplink data that is retransmitted by the user equipment on the unlicensed carrier, where the needed resource is a resource that is on the unlicensed carrier and that is needed when the uplink data is retransmitted by using the synchronous HARQ mode; and the sending unit is further configured to send second indication information to the user equipment, where the second indication information is used to instruct to retransmit the uplink data by using the asynchronous HARQ mode.

With reference to the foregoing possible implementations, in a sixth possible implementation of the sixth aspect, the second indication information is carried in downlink control information; and the second indication information includes at least one of the following fields: a HARQ mode field or a HARQ mapping field, where the HARQ mode field is used to indicate the synchronous HARQ mode or the asynchronous HARQ mode, and the HARQ mapping field is used to indicate a HARQ process number.

With reference to the foregoing possible implementations, in a seventh possible implementation of the sixth aspect, the determining unit is specifically configured to: when determining that a percentage, in the needed resource, of a part that has not been obtained through contention in the needed resource exceeds a threshold, determine to receive, by using the asynchronous HARQ mode, the uplink data that is retransmitted by the user equipment on the unlicensed carrier; or the determining unit is further configured to: when determining that a percentage, in the needed resource, of a part that has not been obtained through contention in the needed resource is less than the threshold, determine to receive, by using the synchronous HARQ mode, the uplink data that is retransmitted by the user equipment on the unlicensed carrier.

According to a seventh aspect, another apparatus for transmitting uplink data in an LAA system is provided, including: a determining unit, configured to determine that a needed resource has not been obtained through contention, where the needed resource is a resource that is on an unlicensed carrier and that is needed when user equipment retransmits uplink data by using an uplink HARQ mode; and a processing unit, configured to perform puncturing processing on the uplink data when the determining unit determines that the needed resource has not been obtained through contention.

In a first possible implementation of the seventh aspect, the determining unit is specifically configured to determine that a part of the needed resource has not been obtained through contention; the processing unit is specifically configured to perform puncturing processing on the uplink data according to the part that has not been obtained through contention in the needed resource; and the apparatus further includes a sending unit, configured to retransmit the uplink data on which the processing unit has performed the puncturing processing to a network device by using a part obtained through contention in the needed resource.

With reference to the foregoing possible implementation, in a second possible implementation of the seventh aspect, the apparatus further includes a receiving unit, configured to: before the processing unit performs puncturing processing on the uplink data, receive indication information sent by the network device, where the indication information is used to instruct to perform puncturing processing on the uplink data, where the processing unit is specifically configured to perform puncturing processing on the uplink data according to the indication information received by the receiving unit.

With reference to the foregoing possible implementations, in a third possible implementation of the seventh aspect, the indication information is carried in downlink control information; and the indication information includes at least one of the following fields: a carrier indicator field or a puncturing configuration field, where the carrier indicator field is used to indicate the unlicensed carrier, and the puncturing configuration field is used to indicate a starting puncturing location and a puncturing length.

According to an eighth aspect, another apparatus for transmitting uplink data in an LAA system is provided, including: a determining unit, configured to determine that a needed resource has not been obtained through contention, where the needed resource is a resource that is on an unlicensed carrier and that is needed when user equipment retransmits uplink data by using an uplink HARQ mode; and a sending unit, configured to send first indication information to the user equipment when the determining unit determines that the needed resource has not been obtained through contention, where the first indication information is used to instruct the user equipment to perform puncturing processing on the uplink data.

In a first possible implementation of the eighth aspect, the determining unit is specifically configured to determine that a part of the needed resource has not been obtained through contention; the first indication information is specifically used to instruct the user equipment to perform puncturing processing on the uplink data according to the part that has not been obtained through contention in the needed resource; and the apparatus further includes a first receiving unit, configured to receive the uplink data on which the puncturing processing has been performed and that is retransmitted by the user equipment by using a part obtained through contention in the needed resource.

With reference to the foregoing possible implementation, in a second possible implementation of the eighth aspect, the first indication information is carried in downlink control information; and the first indication information includes at least one of the following fields: a carrier indicator field or a puncturing configuration field, where the carrier indicator field is used to indicate the unlicensed carrier, and the puncturing configuration field is used to indicate a starting puncturing location and a puncturing length.

With reference to the foregoing possible implementations, in a third possible implementation of the eighth aspect, the apparatus further includes a second receiving unit, configured to: before the determining unit determines that the needed resource has not been obtained through contention, receive second indication information sent by the user equipment, where the second indication information is used to indicate that the user equipment has not obtained the needed resource through contention, where the determining unit is specifically configured to determine, according to the second indication information received by the second receiving unit, that the needed resource has not been obtained through contention.

Based on the foregoing technical solutions, in the method for transmitting uplink data in an LAA system according to the embodiments of the present invention, the synchronous HARQ mode and the asynchronous HARQ mode are configured for uplink transmission of the user equipment on the unlicensed carrier, so that when performing specific uplink transmission on the unlicensed carrier, the user equipment may determine to use the synchronous HARQ mode or the asynchronous HARQ mode, thereby avoiding a problem that the UE cannot perform retransmission because a time resource obtained by the UE through contention on the unlicensed carrier is limited, and improving flexibility of performing uplink transmission on the unlicensed carrier by the UE. In addition, the network device can combine received uplink data that the UE sends for multiple times, thereby improving data transmission performance and overall system performance.

BRIEF DESCRIPTION OF DRAWINGS

To describe the technical solutions in the embodiments of the present invention more clearly, the following briefly describes the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
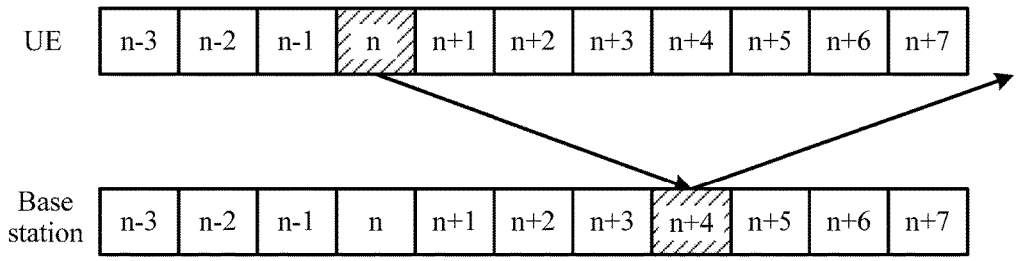
FIG. 1 is a schematic diagram of a subframe in which uplink transmission is performed by using a synchronous HARQ mode in the prior art.

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions in the embodiments of the present invention may be applied to various communications systems that use an LAA mechanism, such as a Global System for Mobile Communications (Global System for Mobile communication, GSM) system, a Code Division Multiple Access (Code Division Multiple Access, CDMA) system, a Wideband Code Division Multiple Access (Wideband Code Division Multiple Access, WCDMA) system, a Long Term Evolution (Long Term Evolution, LTE) system, an LTE frequency division duplex (Frequency Division Duplex, FDD) system, an LTE time division duplex (Time Division Duplex, TDD) system, a Universal Mobile Telecommunications System (Universal Mobile Telecommunication System, UMTS), and a future 5G communications system.

It should be further understood that, the user equipment in the embodiments of the present invention may communicate with one or more core networks by using a radio access network (Radio Access Network, "RAN" for short), and the terminal device may be referred to as an access terminal, terminal equipment, a subscriber unit, a subscriber station, a mobile station, a mobile console, a remote station, a remote terminal, a mobile device, a user terminal, a terminal, a radio communications device, a user agent, or a user apparatus. The user equipment may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, or user equipment in a future 5G network.

It should be further understood that in the embodiments of the present invention, a network device may be configured to communicate with user equipment. The network device may be a base transceiver station (Base Transceiver Station, BTS) in a GSM system or a CDMA system, may be a NodeB (NodeB, NB) in a WCDMA system, or may be an evolved NodeB (Evolutional Node B, eNB or eNodeB) in an LTE system. Alternatively, the network device may be a relay station, an access point, an in-vehicle device, a wearable device, a base station device in a future 5G network, or the like.

It should be further understood that the embodiments of the present invention may be applied to a licensed-carrier-assisted access system. That is, UE accesses an unlicensed carrier with the assistance of a licensed carrier. This system does not support independent access to an unlicensed carrier. In this system, the unlicensed carrier may be accessed by using an LBT mechanism, and duration of each access to the unlicensed carrier is limited. In the embodiments of the present invention, the system is referred to as a licensed-assisted access (Licensed-Assisted Access, LAA) system, and this system may have another name. This is not limited in the embodiments of the present invention.

A network device (for example, a base station, or a base station controller) and user equipment in a cellular network may communicate with each other by using a licensed carrier or an unlicensed carrier. Before performing data transmission by using an unlicensed carrier, the network device or the user equipment may contend for a resource on the unlicensed carrier with a node in a wireless local area network (Wireless Local Area Network, WLAN) and another LAA node in a cellular network using an LAA mechanism, and after obtaining the resource through contention, the network device or the user equipment performs data transmission by using the resource obtained through contention. The user equipment or the network device may contend for a channel based on an LBE manner or an FBE manner. This is not limited in the embodiments of the present invention.

Figure 2:
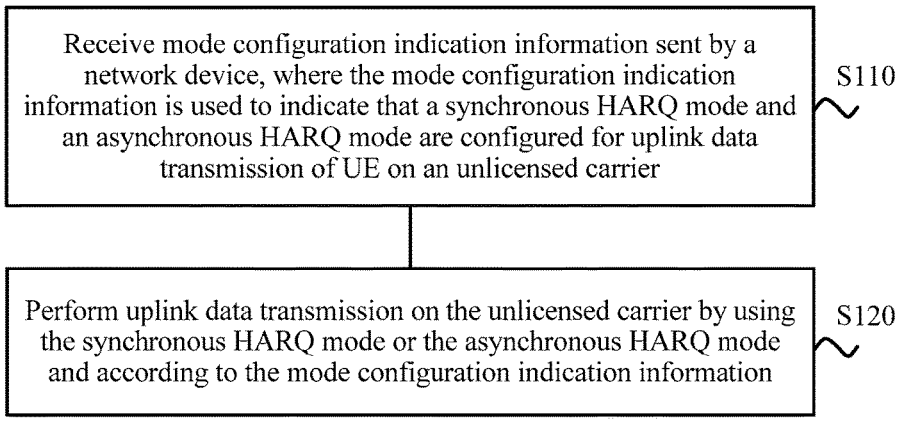
FIG. 2 is a schematic flowchart of a method for transmitting uplink data in an LAA system according to an embodiment of the present invention.

FIG. 2 is a schematic flowchart of a method 100 for transmitting uplink data in an LAA system according to an embodiment of the present invention. The method 100 may be performed by user equipment.

S110. Receive mode configuration indication information sent by a network device, where the mode configuration indication information is used to indicate that a synchronous HARQ mode and an asynchronous HARQ mode are configured for uplink transmission of UE on an unlicensed carrier.

The network device configures, for the UE, the synchronous HARQ mode and the asynchronous HARQ mode that are applicable to uplink transmission on the unlicensed carrier. In this way, when performing specific uplink transmission on the unlicensed carrier, the UE may determine a used HARQ mode from the configured synchronous HARQ mode and asynchronous HARQ mode. Optionally, the UE may use the synchronous HARQ mode for one or more uplink transmissions on the unlicensed carrier, and use the asynchronous HARQ mode for other uplink transmissions on the unlicensed carrier. However, this embodiment of the present invention is not limited thereto.

In an optional embodiment, the mode configuration indication information may be used to indicate that the synchronous HARQ mode and the asynchronous HARQ mode are configured for uplink transmission of the UE on one or more specific unlicensed carriers. In this case, when performing uplink transmission on the one or more unlicensed carriers, the UE may determine, from the optional synchronous HARQ mode and asynchronous HARQ mode, a HARQ mode used for current uplink transmission, and when the UE performs uplink transmission on another unlicensed carrier other than the one or more unlicensed carriers, there may be only one optional HARQ mode, that is, the synchronous HARQ mode or the asynchronous HARQ mode. In another optional embodiment, the mode configuration indication information may be used to indicate that the synchronous HARQ mode and the asynchronous HARQ mode are configured for uplink transmission of the UE on all unlicensed carriers. In this case, when performing uplink transmission on all unlicensed carriers, the UE may determine, from the optional synchronous HARQ mode and asynchronous HARQ mode, a HARQ mode used for current uplink transmission. However, this embodiment of the present invention is not limited thereto.

S120. Perform uplink transmission on the unlicensed carrier by using the synchronous HARQ mode or the asynchronous HARQ mode and according to the mode configuration indication information.

After receiving the mode configuration indication information, the UE may determine that a HARQ mode that may be used on the unlicensed carrier is the synchronous HARQ mode and the asynchronous HARQ mode, and determine, according to a specific status of each uplink transmission, whether the synchronous HARQ mode or the asynchronous HARQ mode is used for current uplink transmission.

Therefore, in the method for transmitting uplink data in an LAA system according to this embodiment of the present invention, the synchronous HARQ mode and the asynchronous HARQ mode are configured for uplink transmission of the user equipment on the unlicensed carrier, so that when performing specific uplink transmission on the unlicensed carrier, the user equipment may determine to use the synchronous HARQ mode or the asynchronous HARQ mode, thereby avoiding a problem that the UE cannot perform retransmission because a time resource obtained by the UE through contention on the unlicensed carrier is limited, and improving flexibility of performing uplink transmission on the unlicensed carrier by the UE. In addition, the network device can combine received uplink data that the UE sends for multiple times, thereby improving data transmission performance and overall system performance.

In this embodiment of the present invention, in the synchronous HARQ mode, an interval between a subframe and a corresponding retransmission subframe may be fixed. For example, both an interval between a subframe number of a subframe occupied for data transmission and a subframe number of a feedback subframe and an interval between the subframe number of the feedback subframe and a subframe number of a retransmission subframe are 4. In this case, a receive end does not need to be notified of a HARQ process number corresponding to data retransmission. In the asynchronous HARQ mode, data may be retransmitted in any available time after previous transmission, and a receive end needs to be notified of a specific HARQ process number corresponding to data transmission. However, this embodiment of the present invention is not limited thereto.

In an optional embodiment, the mode configuration indication information is further used to indicate mode switching of the UE between the synchronous HARQ mode and the asynchronous HARQ mode.

In this case, the mode configuration indication information is further used to indicate that the UE may switch between the synchronous HARQ mode and the asynchronous HARQ mode. Optionally, the mode configuration indication information may be further used to indicate default HARQ mode configuration of the UE. For example, the mode configuration indication information may be used to instruct the UE to perform uplink transmission on the unlicensed carrier by using the synchronous HARQ mode by default. Optionally, the mode configuration indication information may further indicate a switching trigger condition for switching between the synchronous HARQ mode and the asynchronous HARQ mode. For example, the mode configuration indication information may be used to instruct the UE to switch from the synchronous HARQ mode to the asynchronous HARQ mode when the UE determines that the UE cannot retransmit uplink data on the unlicensed carrier according to the synchronous HARQ mode (for example, a resource needed for retransmitting uplink data on the unlicensed carrier by using the synchronous HARQ mode has not been obtained through contention). However, this embodiment of the present invention is not limited thereto.

In this embodiment of the present invention, the network device may send the mode configuration indication information to the UE in multiple manners. For example, the mode configuration indication information is carried in downlink control information (Downlink Control Information, DCI), radio resource control (Radio Resource Control, RRC) signaling, a system message (for example, a system information block (System Information Block, SIB)), or another message for sending. This is not limited in this embodiment of the present invention.

In an optional embodiment, the receiving mode configuration indication information sent by a network device in S110 includes:

receiving a system message sent by the network device, where the system message carries the mode configuration indication information; or receiving RRC signaling sent by the network device, where the RRC signaling carries the mode configuration indication information; or receiving DCI sent by the network device, where the DCI carries the mode configuration indication information.

The network device may send the mode configuration indication information to the UE in a unicast manner. Optionally, if the network device configures the synchronous HARQ mode and the asynchronous HARQ mode for uplink transmission of multiple UEs supporting LAA on the unlicensed carrier, the network device may send the mode configuration indication information in a broadcast manner or a multicast manner. This is not limited in this embodiment of the present invention.

Figure 3:
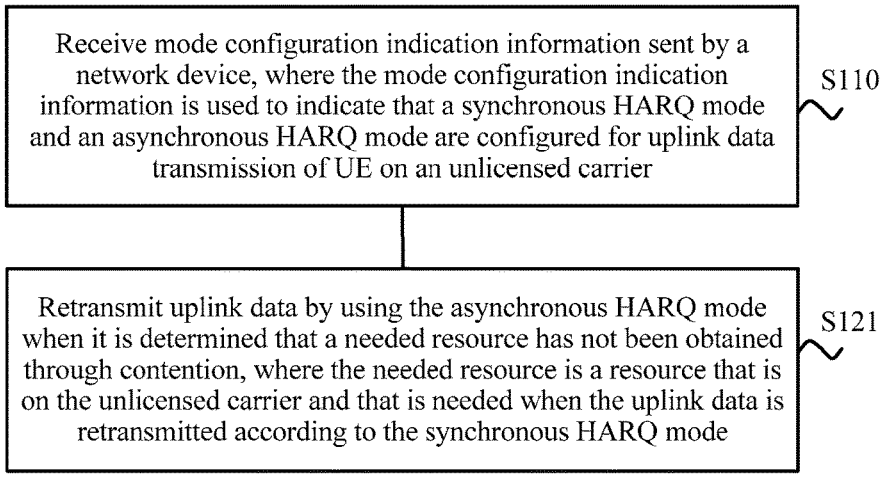
FIG. 3 is another schematic flowchart of a method for transmitting uplink data in an LAA system according to an embodiment of the present invention.

In S120, when performing uplink transmission by using the unlicensed carrier, the UE may determine a used HARQ mode from the synchronous HARQ mode and the asynchronous HARQ mode in multiple manners. In an optional embodiment, as shown in FIG. 3, the performing uplink transmission on the unlicensed carrier by using the synchronous HARQ mode or the asynchronous HARQ mode in S120 includes the following step:

S121. Retransmit uplink data by using the asynchronous HARQ mode when it is determined that a needed resource has not been obtained through contention, where the needed resource is a resource that is on the unlicensed carrier and that is needed when the uplink data is retransmitted according to the synchronous HARQ mode.

The needed resource is a resource on the unlicensed carrier, and the needed resource is located in a first retransmission subframe corresponding to the uplink data in the synchronous HARQ mode. The first retransmission subframe corresponding to the uplink data in the synchronous HARQ mode may be specifically a first retransmission subframe, in the synchronous HARQ mode, corresponding to a subframe occupied for transmitting the uplink data. Optionally, the needed resource may include all symbol resources in the first retransmission subframe, or include only some symbol resources in the first retransmission subframe. This embodiment of the present invention is not limited thereto.

When determining that the resource needed for retransmitting the uplink data on the unlicensed carrier by using the synchronous HARQ mode has not been obtained through contention, the UE may determine to retransmit the uplink data on the unlicensed carrier by using the asynchronous HARQ mode. For example, if the UE transmits uplink data to the network device in a first subframe (by using the unlicensed carrier or another carrier), and the UE receives, in a feedback subframe corresponding to the first subframe, feedback information (for example, a NACK) that is sent by the network device and that is used to indicate that the uplink data is not received successfully, the UE may determine, according to the synchronous HARQ mode, a first retransmission subframe corresponding to the first subframe, and determine to retransmit the uplink data in the first retransmission subframe. Further, the UE may determine whether the needed resource on the unlicensed carrier has been obtained through contention. The needed resource is located in the first retransmission subframe. If the UE determines that the needed resource on the unlicensed carrier has been obtained through contention, the UE may retransmit the uplink data by using a resource obtained through contention in the first retransmission subframe and on the unlicensed carrier. If the UE determines that the needed resource on the unlicensed carrier has not been obtained through contention, the UE may determine to switch from the synchronous HARQ mode to the asynchronous HARQ mode, and retransmit the uplink data on the unlicensed carrier by using the asynchronous HARQ mode. However, this embodiment of the present invention is not limited thereto.

In this embodiment of the present invention, the UE may determine, in multiple manners, that the needed resource on the unlicensed carrier has not been obtained through contention. In an optional embodiment, the UE may contend for the needed resource on the unlicensed carrier with another node. Specifically, the UE may listen to a channel of the unlicensed carrier, and determine, according to a listening result, whether the needed resource on the unlicensed carrier has been obtained through contention. In this case, if the UE determines, according to the listening result, that the needed resource on the unlicensed carrier has been obtained through contention, the UE may retransmit the uplink data by using the resource obtained through contention on the unlicensed carrier. In another optional embodiment, the network device may contend for the needed resource on the unlicensed carrier with another node. For example, the network device listens to a channel of the unlicensed carrier, and determines, according to a listening result, whether the needed resource on the unlicensed carrier has been obtained through contention. In this case, if the network device has obtained the needed resource on the unlicensed carrier through contention, the network device may schedule the UE to retransmit the uplink data by using the resource obtained by the network device through contention on the unlicensed carrier. Alternatively, if the network device has not obtained the needed resource on the unlicensed carrier through contention, the network device may send contention failure indication information to the UE, and correspondingly, the UE may determine, according to the contention failure indication information, that the needed resource on the unlicensed carrier has not been obtained through contention. However, this embodiment of the present invention is not limited thereto.

In an optional embodiment, that it is determined that a needed resource has not been obtained through contention includes:

receiving third indication information sent by the network device, where the third indication information is used to indicate that the network device has not obtained the needed resource through contention; and determining, according to the third indication information, that the needed resource has not been obtained through contention.

The third indication information may be sent on a licensed carrier, or may be sent on a resource obtained by the network device through contention on the unlicensed carrier, or may be sent on a resource obtained by the network device through contention on another unlicensed carrier other than the unlicensed carrier. In addition, the third indication information may be carried in DCI, RRC signaling, or another message for sending. This embodiment of the present invention is not limited thereto.

It should be understood that, in this embodiment of the present invention, that the needed resource on the unlicensed carrier has not been obtained through contention may be: A result of contending for the needed resource on the unlicensed carrier by the UE or the network device is failure. That the needed resource on the unlicensed carrier has not been obtained through contention may be specifically: All resources in the first retransmission subframe and on the unlicensed carrier have not been obtained through contention, or some resources in the first retransmission subframe and on the unlicensed carrier have been obtained through contention, and the other resources in the first retransmission subframe and on the unlicensed carrier have not been obtained through contention, where the resources in the first retransmission subframe that have been obtained through contention are fewer than resources needed for retransmitting the uplink data. However, this embodiment of the present invention is not limited thereto.

When determining that the needed resource on the unlicensed carrier has not been obtained through contention, the UE may determine, in multiple manners, to switch from the synchronous HARQ mode to the asynchronous HARQ mode, and retransmit the uplink data by using the asynchronous HARQ mode. Optionally, when determining that the needed resource on the unlicensed carrier has not been obtained through contention, the UE may determine, according to a preset mode switching trigger condition or another configuration, to switch from the synchronous HARQ mode to the asynchronous HARQ mode. In this case, the UE may further notify the network device of a HARQ mode that is used by the UE when the UE retransmits the uplink data, so that the network device receives, according to the HARQ mode notified by the UE, the uplink data retransmitted by the UE. Correspondingly, before S121, the method 100 further includes:

when it is determined that the needed resource has not been obtained through contention, determining to retransmit the uplink data by using the asynchronous HARQ mode; and sending first indication information to the network device, where the first indication information is used to indicate that the user equipment retransmits the uplink data by using the asynchronous HARQ mode.

The first indication information may be used to indicate that the UE performs data transmission by using the asynchronous HARQ mode. In this way, after receiving the first indication information, the network device may determine, according to the asynchronous HARQ mode indicated in the first indication information, a second retransmission subframe corresponding to the uplink data, and receive, in the second retransmission subframe, the uplink data that is retransmitted by the user equipment on the unlicensed carrier. However, this embodiment of the present invention is not limited thereto.

Optionally, the first indication information may be carried in uplink control information (Uplink Control Information, UCI) for sending. In addition, the UE may send the first indication information to the network device by using a licensed carrier, or send the first indication information to the network device by using the resource obtained through contention on the unlicensed carrier. This is not limited in this embodiment of the present invention. In addition, the UE may indicate in the first indication information explicitly or implicitly that the uplink data is retransmitted by using the asynchronous HARQ mode. Optionally, the first indication information may include information about the asynchronous HARQ mode. In addition, if the UE has multiple pieces of uplink data to be retransmitted, the first indication information may further include information about a HARQ process corresponding to the uplink data, for example, a number of the HARQ process. However, this embodiment of the present invention is not limited thereto. Optionally, in another embodiment, the first indication information may indicate explicitly that the uplink data is retransmitted by using the asynchronous HARQ mode. For example, the first indication information occupies one bit. When a value of the bit is set to 1, it indicates that the HARQ mode used by the UE remains unchanged, or it indicates that the UE uses the synchronous HARQ mode. When the value of the bit is set to 0, it indicates that the UE uses the asynchronous HARQ mode or it indicates that the UE changes a used HARQ mode or a HARQ mode used by the UE is switched from the synchronous HARQ mode to the asynchronous HARQ mode. Alternatively, the opposite case is true. However, this embodiment of the present invention is not limited thereto.

In another optional embodiment, when determining that the needed resource on the unlicensed carrier has not been obtained through contention, the network device may determine that the UE needs to retransmit the uplink data by using the asynchronous HARQ mode, and notify the UE of the decision. Correspondingly, the UE may determine, according to indication information sent by the network device, to retransmit the uplink data by using the asynchronous HARQ mode. In this case, the network device may contend for the resource on the unlicensed carrier, or the UE contends for the resource on the unlicensed carrier and reports to the network device that the UE has not obtained the needed resource on the unlicensed carrier through contention. However, this embodiment of the present invention is not limited thereto. Correspondingly, before S121, the method 100 further includes:

receiving second indication information that is sent by the network device when the network device determines that the needed resource has not been obtained through contention, where the second indication information is used to instruct the user equipment to retransmit the uplink data by using the asynchronous HARQ mode; and determining, according to the second indication information, to retransmit the uplink data by using the asynchronous HARQ mode.

The second indication information may be sent on a licensed carrier, or may be sent on a resource obtained by the network device through contention on the unlicensed carrier, or may be sent on a resource obtained by the network device through contention on another unlicensed carrier other than the unlicensed carrier. In addition, the second indication information may be carried in DCI, RRC signaling, or another message for sending. This is not limited in this embodiment of the present invention.

The second indication information may explicitly or implicitly instruct the UE to retransmit the uplink data by using the asynchronous HARQ mode. For information carried in the second indication information, refer to the foregoing descriptions of the first indication information. For brevity, details are not described herein again.

In an optional embodiment, the second indication information is carried in downlink control information. In this case, the second indication information includes at least one of the following fields: a HARQ mode field or a HARQ mapping field, where the HARQ mode field is used to indicate that the synchronous HARQ mode or the asynchronous HARQ mode is used, and the HARQ mapping field is used to indicate a HARQ process number corresponding to the uplink data.

Table 1 shows an example in which the second indication information is DCI. A carrier indicator field (Carrier Indicator Field, CIF) field occupies three bits, to indicate a carrier scheduled by the DCI. A HARQ number field occupies three bits for a frequency division duplex (Frequency Division Duplex, FDD) system, and occupies four bits for a time division duplex (Time Division Duplex, TDD) system, to indicate a number of a HARQ process. A new data indicator (New Data Indicator, NDI) field occupies one bit, to represent a transmission type. When a value of the bit is 0, it represents new transmission, and when the value of the bit is 1, it represents retransmission. A modulation and coding scheme (Modulation and Coding Scheme, MCS) field occupies five bits, to indicate an MCS used during transmission. A HARQ mode field occupies one bit, to indicate the synchronous HARQ mode or the asynchronous HARQ mode. Optionally, the DCI may be in another format. This embodiment of the present invention is not limited thereto.

TABLE 1

Example of a DCI format

| Field | CIF | HARQ number | NDI | MCS | HARQ mode |
|---|---|---|---|---|---|
| Bit quantity | 3 | FDD: 3<br>TDD: 4 | 1 | 5 | 1 |

In this embodiment of the present invention, provided that the UE determines that the needed resource on the unlicensed carrier has not been obtained through contention, the UE may retransmit the uplink data by using the asynchronous HARQ mode. In another optional embodiment, the retransmitting uplink data by using the asynchronous HARQ mode when it is determined that a needed resource has not been obtained through contention in S121 includes:

retransmitting the uplink data by using the asynchronous HARQ mode when it is determined that a percentage, in the needed resource, of a part that has not been obtained through contention in the needed resource exceeds a threshold; or correspondingly, the method 100 further includes:

retransmitting the uplink data by using the synchronous HARQ mode when it is determined that a percentage, in the needed resource, of a part that has not been obtained through contention in the needed resource is less than the threshold.

Figure 4:
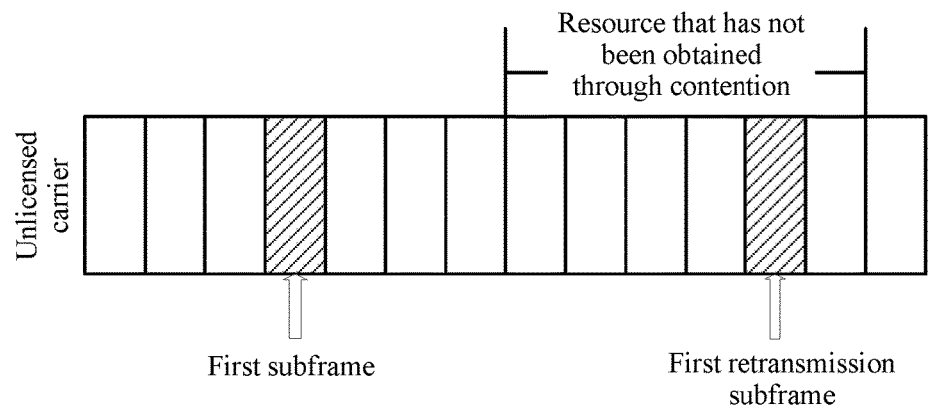
FIG. 4 shows an example of a method for transmitting uplink data in an LAA system according to an embodiment of the present invention.
Figure 5:
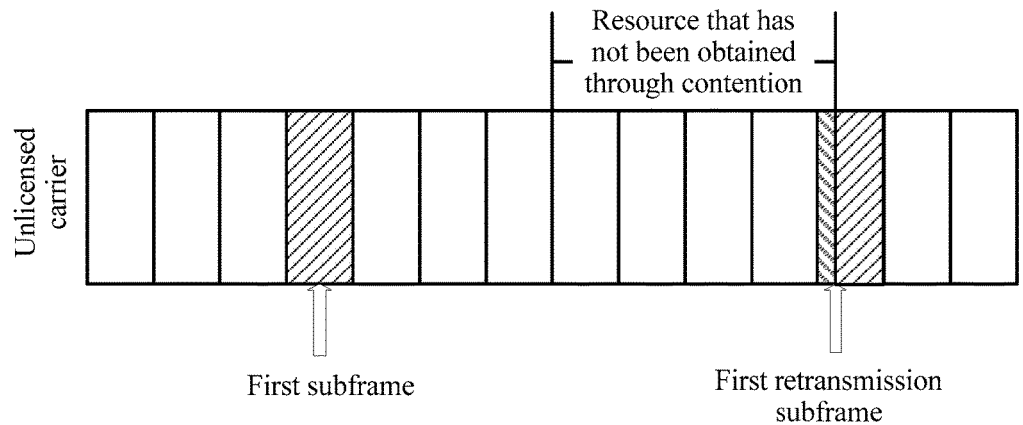
FIG. 5 shows another example of a method for transmitting uplink data in an LAA system according to an embodiment of the present invention.

The threshold may be configured by the network device, or may be predefined. This embodiment of the present invention is not limited thereto. In this case, the UE may determine the percentage, in the needed resource, of the part that has not been obtained through contention in the needed resource on the unlicensed carrier, and only when determining that the percentage, in the needed resource, of the part that has not been obtained through contention exceeds a threshold, for example, in a scenario shown in FIG. 4, the UE determines that no resource in the first retransmission subframe and on the unlicensed carrier has been obtained through contention, the UE retransmits the uplink data by using the asynchronous HARQ mode; otherwise, for example, as shown in FIG. 5, when the UE determines that a large part of the needed resource on the unlicensed carrier has been obtained through contention, the UE may retransmit the uplink data by using the synchronous HARQ mode.

In an optional embodiment, the retransmitting the uplink data by using the synchronous HARQ mode when it is determined that a percentage, in the needed resource, of a part that has not been obtained through contention in the needed resource is less than the threshold includes:

when it is determined that the percentage, in the needed resource, of the part that has not been obtained through contention in the needed resource is less than the threshold, performing puncturing processing on the uplink data according to the part that has not been obtained through contention in the needed resource.

The UE may perform puncturing processing on a part, in the uplink data, corresponding to the part that has not been obtained through contention, and retransmit, by using the resource obtained through contention in the first retransmission subframe, the uplink data on which the puncturing processing has been performed. In this case, after receiving the uplink data on which the puncturing processing has been performed, the network device may still combine the received uplink data that is previously transmitted by the UE and the received uplink data that is retransmitted by the UE and on which the puncturing processing has been performed. This embodiment of the present invention is not limited thereto.

Therefore, in the method for transmitting uplink data in an LAA system according to this embodiment of the present invention, the synchronous HARQ mode and the asynchronous HARQ mode are configured for uplink transmission of the user equipment on the unlicensed carrier, so that when performing specific uplink transmission on the unlicensed carrier, the user equipment may determine to use the synchronous HARQ mode or the asynchronous HARQ mode, thereby avoiding a problem that the UE cannot perform retransmission because a time resource obtained by the UE through contention on the unlicensed carrier is limited, and improving flexibility of performing uplink transmission on the unlicensed carrier by the UE. In addition, the network device can combine received uplink data that the UE sends for multiple times, thereby improving data transmission performance and overall system performance.

Figure 6:
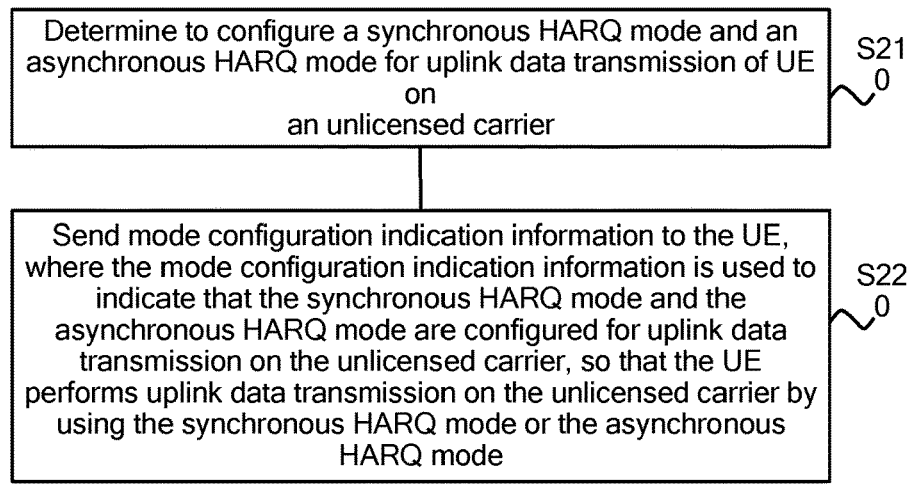
FIG. 6 is a schematic flowchart of a method for transmitting uplink data in an LAA system according to another embodiment of the present invention.

FIG. 6 shows another method 200 for transmitting uplink data in an LAA system according to an embodiment of the present invention. The method 200 may be performed by a network device. The network device may be a base station or another network element. This is not limited in this embodiment of the present invention.

S210. Determine to configure a synchronous hybrid automatic repeat request HARQ mode and an asynchronous HARQ mode for uplink transmission of UE on an unlicensed carrier.

S220. Send mode configuration indication information to the UE, where the mode configuration indication information is used to indicate that the synchronous HARQ mode and the asynchronous HARQ mode are configured for the uplink transmission on the unlicensed carrier, so that the UE performs uplink transmission on the unlicensed carrier by using the synchronous HARQ mode or the asynchronous HARQ mode.

Therefore, in the method for transmitting uplink data in an LAA system according to this embodiment of the present invention, the synchronous HARQ mode and the asynchronous HARQ mode are configured for uplink transmission of the user equipment on the unlicensed carrier, so that when performing specific uplink transmission on the unlicensed carrier, the user equipment may determine to use the synchronous HARQ mode or the asynchronous HARQ mode, thereby avoiding a problem that the UE cannot perform retransmission because a time resource obtained by the UE through contention on the unlicensed carrier is limited, and improving flexibility of performing uplink transmission on the unlicensed carrier by the UE. In addition, the network device can combine received uplink data that the UE sends for multiple times, thereby improving data transmission performance and overall system performance.

In an optional embodiment, the mode configuration indication information is further used to indicate mode switching between the synchronous HARQ mode and the asynchronous HARQ mode.

In an optional embodiment, the sending mode configuration indication information to the UE in S220 includes:

sending a system message to the UE, where the system message carries the mode configuration indication information; or sending RRC signaling to the UE, where the RRC signaling carries the mode configuration indication information; or sending DCI to the UE, where the DCI carries the mode configuration indication information.

In another optional embodiment, the method 200 further includes: determining to receive, by using the asynchronous HARQ mode, uplink data that is retransmitted by the UE on the unlicensed carrier.

Specifically, the network device may receive uplink data that is transmitted by the UE in a first subframe, and perform demodulation and checking processing on the received uplink data, to determine whether the uplink data transmitted in the first subframe is successfully received. The network device may determine, according to the synchronous HARQ mode, a feedback subframe corresponding to the first subframe, and send, to the UE in the feedback subframe, feedback information used to indicate whether the uplink data is successfully received, for example, ACK/NACK. Optionally, if the network device does not successfully receive the uplink data, the network device may send a NACK to the UE in the feedback subframe, so that the UE determines, according to the NACK, that the uplink data needs to be retransmitted. Correspondingly, before the determining to receive, by using the asynchronous HARQ mode, uplink data that is retransmitted by the UE on the unlicensed carrier, the method 200 may further include: sending feedback information to the UE according to the synchronous HARQ mode in the feedback subframe corresponding to the first subframe, where the feedback information is used to indicate that the network device does not successfully receive the uplink data transmitted by the UE.

In this embodiment of the present invention, the network device may determine, in multiple manners, to receive, by using the asynchronous HARQ mode, the uplink data retransmitted by the UE. In an optional embodiment, the network device may determine, according to configuration of the UE, to receive, by using the asynchronous HARQ mode, the uplink data retransmitted by the UE. In another optional embodiment, the determining to receive, by using the asynchronous HARQ mode, uplink data that is retransmitted by the UE on the unlicensed carrier includes:

receiving first indication information sent by the UE, where the first indication information is used to indicate that the UE retransmits the uplink data by using the asynchronous HARQ mode; and determining, according to the first indication information, to receive, by using the asynchronous HARQ mode, the uplink data that is retransmitted by the UE on the unlicensed carrier.

In this case, the UE may contend for the resource on the unlicensed carrier, and when the UE determines that a resource needed for retransmitting the uplink data on the unlicensed carrier by using the synchronous HARQ mode has not been obtained through contention, the UE may determine to retransmit the uplink data by using the asynchronous HARQ mode, and send the first indication information to the network device, to instruct the network device to receive, according to the asynchronous HARQ mode, the uplink data retransmitted by the UE. However, this embodiment of the present invention is not limited thereto.

In another optional embodiment, the determining to receive, by using the asynchronous HARQ mode, uplink data that is retransmitted by the UE on the unlicensed carrier includes:

determining, when it is determined that a needed resource has not been obtained through contention, to receive, by using the asynchronous HARQ mode, the uplink data that is retransmitted by the UE on the unlicensed carrier, where the needed resource is a resource that is on the unlicensed carrier and that is needed when the uplink data is retransmitted by using the synchronous HARQ mode; and correspondingly, the method 200 further includes: sending second indication information to the UE, where the second indication information is used to instruct the UE to retransmit the uplink data by using the asynchronous HARQ mode.

In this case, when determining that a result of contending for the needed resource on the unlicensed carrier is failure, the network device determines that the uplink data is retransmitted by using the asynchronous HARQ mode, and sends the second indication information to the UE, to instruct the UE to retransmit the uplink data by using the asynchronous HARQ mode, that is, switch from the synchronous HARQ mode to the asynchronous HARQ mode.

In this embodiment of the present invention, the network device may send the second indication information in multiple manners. In an optional embodiment, the second indication information is carried in downlink control information. In this case, the second indication information includes at least one of the following fields: a HARQ mode field or a HARQ mapping field, where the HARQ mode field is used to indicate the synchronous HARQ mode or the asynchronous HARQ mode, and the HARQ mapping field is used to indicate a HARQ process number.

The network device may determine, in multiple manners, that the needed resource on the unlicensed carrier has not been obtained through contention. Optionally, the network device may listen to a channel of the unlicensed carrier, and determine, according to a listening result, whether the needed resource on the unlicensed carrier is obtained through contention. Alternatively, the UE may listen to a channel of the unlicensed carrier, and when determining that the UE has not obtained the needed resource on the unlicensed carrier through contention, the UE sends contention failure indication information to the network device. Correspondingly, the network device may determine, according to the contention failure indication information, that the needed resource on the unlicensed carrier has not been obtained through contention. This embodiment of the present invention is not limited thereto.

In an optional embodiment, that it is determined that a needed resource has not been obtained through contention includes:

receiving third indication information sent by the UE, where the third indication information is used to indicate that the UE has not obtained the needed resource on the unlicensed carrier through contention; and determining, according to the third indication information, that the needed resource on the unlicensed carrier has not been obtained through contention.

In this embodiment of the present invention, provided that the network device determines that the needed resource on the unlicensed carrier has not been obtained through contention, the network device may determine that the uplink data needs to be retransmitted by using the asynchronous HARQ mode. In another optional embodiment, the determining, when it is determined that a needed resource has not been obtained through contention, to receive, by using the asynchronous HARQ mode, the uplink data that is retransmitted by the UE on the unlicensed carrier includes:

when it is determined that a percentage, in the needed resource, of a part that has not been obtained through contention in the needed resource exceeds a threshold, determining to receive, by using the asynchronous HARQ mode, the uplink data that is retransmitted by the UE on the unlicensed carrier; or correspondingly, the method 200 further includes:

when it is determined that a percentage, in the needed resource, of a part that has not been obtained through contention in the needed resource is less than the threshold, determining to receive, by using the synchronous HARQ mode, the uplink data that is retransmitted by the UE on the unlicensed carrier.

Specifically, the network device may determine the percentage, in the needed resource, of the part that has not been obtained through contention in the needed resource on the unlicensed carrier, and only when determining that the percentage, in the needed resource, of the part that has not been obtained through contention exceeds a specific threshold, the network device determines that the uplink data needs to be retransmitted by using the asynchronous HARQ mode; otherwise, for example, the network device determines that none of the parts of the needed resource on the unlicensed carrier has been obtained through contention, the network device may determine that the uplink data is retransmitted by using the synchronous HARQ mode. Optionally, the UE may perform puncturing processing on a part, in the uplink data, corresponding to the part that has not been obtained through contention, and retransmit, by using the resource obtained through contention in a first retransmission subframe, the uplink data on which the puncturing processing has been performed. In this case, after receiving the uplink data on which the puncturing processing has been performed, the network device may still combine the received uplink data that is previously transmitted by the UE and the received uplink data that is retransmitted by the UE and on which the puncturing processing has been performed. This embodiment of the present invention is not limited thereto.

Therefore, in the method for transmitting uplink data in an LAA system according to this embodiment of the present invention, the synchronous HARQ mode and the asynchronous HARQ mode are configured for uplink transmission of the user equipment on the unlicensed carrier, so that when performing specific uplink transmission on the unlicensed carrier, the user equipment may determine to use the synchronous HARQ mode or the asynchronous HARQ mode, thereby avoiding a problem that the UE cannot perform retransmission because a time resource obtained by the UE through contention on the unlicensed carrier is limited, and improving flexibility of performing uplink transmission on the unlicensed carrier by the UE. In addition, the network device can combine received uplink data that the UE sends for multiple times, thereby improving data transmission performance and overall system performance.

Figure 7:
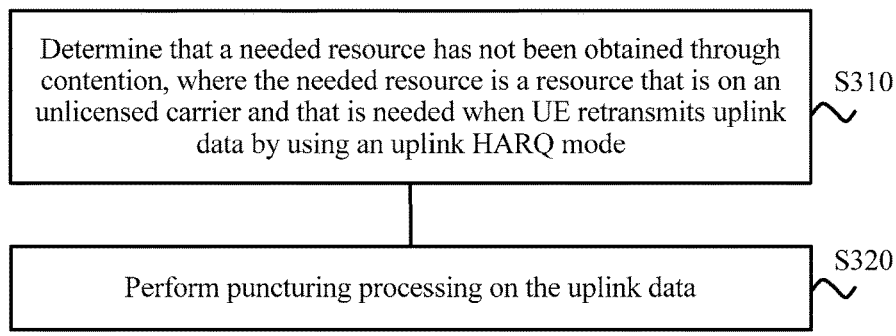
FIG. 7 is a schematic flowchart of a method for transmitting uplink data in an LAA system according to another embodiment of the present invention.

FIG. 7 shows another method 300 for transmitting uplink data in an LAA system according to an embodiment of the present invention. The method 300 may be performed by UE.

S310. Determine that a needed resource has not been obtained through contention, where the needed resource is a resource that is on an unlicensed carrier and that is needed when the UE retransmits uplink data by using an uplink HARQ mode.

The uplink HARQ mode is applicable to uplink transmission of the UE on the unlicensed carrier. Optionally, the uplink HARQ mode may be a synchronous HARQ mode or an asynchronous HARQ mode, and the uplink HARQ mode may be configured by a network device. However, this embodiment of the present invention is not limited thereto.

Specifically, the UE transmits uplink data to the network device in a first subframe (by using the unlicensed carrier or another carrier), and the UE receives, in a feedback subframe corresponding to the first subframe, feedback information (for example, a NACK) that is sent by the network device and that is used to indicate that the uplink data is not successfully received. Then, the UE may determine, according to the synchronous HARQ mode, a first retransmission subframe corresponding to the first subframe, and determine to retransmit the uplink data in the first retransmission subframe.

Further, the UE may determine whether the needed resource on the unlicensed carrier has been obtained through contention. The needed resource is located in the first retransmission subframe. If the UE determines that the needed resource on the unlicensed carrier has not been obtained through contention, the UE may determine to perform puncturing processing on the uplink data. For a manner of determining, by the UE, that the needed resource on the unlicensed carrier has not been obtained through contention, refer to the method 100. For brevity, details are not described herein again.

S320. Perform puncturing processing on the uplink data.

Therefore, in the method for transmitting uplink data according to this embodiment of the present invention, when determining that the resource needed when the uplink data is retransmitted on the unlicensed carrier by using the uplink HARQ mode has not been obtained through contention, the UE performs puncturing processing on the uplink data, so that uplink data can be retransmitted on the unlicensed carrier in the LAA system, an operation is simple, and implementation is easy, thereby improving feasibility and system performance of the LAA system.

Optionally, the UE may perform puncturing processing on all parts of the uplink data. In another optional embodiment, the determining that a needed resource has not been obtained through contention in S310 includes:

determining that a part of the needed resource has not been obtained through contention; and correspondingly, the performing puncturing processing on the uplink data in S320 includes:

performing puncturing processing on the uplink data according to the part that has not been obtained through contention in the needed resource.

In this case, the method 300 further includes:

retransmitting the uplink data on which the puncturing processing has been performed to the network device by using a part obtained through contention in the needed resource.

In this case, the UE may perform puncturing processing on a part, in the uplink data, corresponding to the resource that has not been obtained through contention, and retransmit the uplink data on which the puncturing processing has been performed to the network device. In this way, the network device may combine the received uplink data previously transmitted by the UE and the received uplink data that is retransmitted by the UE and on which the puncturing processing has been performed, to increase a probability that the network device successfully receives the uplink data, thereby improving data transmission performance of the LAA system.

In this embodiment of the present invention, when determining that the needed resource on the unlicensed carrier has not been obtained through contention, the UE may perform puncturing processing on the to-be-retransmitted uplink data according to configuration of the UE, or the UE may determine, according to an indication of the network device, to perform puncturing processing on the uplink data. This embodiment of the present invention is not limited thereto.

In an optional embodiment, before S320, the method 300 further includes:

receiving indication information sent by the network device, where the indication information is used to instruct the UE to perform puncturing processing on the uplink data; and correspondingly, the performing puncturing processing on the uplink data in S320 includes: performing puncturing processing on the uplink data according to the indication information.

The indication information may be sent on a licensed carrier, or may be sent on a resource obtained by the network device through contention on the unlicensed carrier, or may be sent on a resource obtained by the network device through contention on another unlicensed carrier other than the unlicensed carrier. In addition, the indication information may be carried in DCI, RRC signaling, or another message for sending. This is not limited in this embodiment of the present invention.

In an optional embodiment, the indication information is carried in downlink control information; and correspondingly, the indication information includes at least one of the following fields: a carrier indicator field or a puncturing configuration field, where the carrier indicator field is used to indicate the unlicensed carrier, and the puncturing configuration field is used to indicate a starting puncturing location and a puncturing length.

Table 2 shows an example in which the indication information is DCI. A carrier indicator field occupies $N_1$ bits, where $N_1$ is a positive integer less than 5, to indicate an unlicensed carrier. Correspondingly, the UE may determine, according to the carrier indicator field, that a base station has not obtained the needed resource on the unlicensed carrier through contention, and perform puncturing processing on data to be retransmitted on the unlicensed carrier. A puncturing configuration resource occupies $N_2$ bits, to indicate a configuration parameter for puncturing processing performed on the data to be retransmitted on the unlicensed carrier, for example, a starting puncturing location and a puncturing length. A value of $N_2$ may be determined according to an actual situation. This embodiment of the present invention is not limited thereto. Optionally, the DCI may be in another format. This is not limited in this embodiment of the present invention.

TABLE 2

Example of a DCI format

| Field | CIF | HARQ number | NDI | MCS | Carrier indicator | Puncturing configuration |
|---|---|---|---|---|---|---|
| Bit quantity | 3 | FDD: 3 TDD: 4 | 1 | 5 | $N_1$ | $N_2$ |

Therefore, in the method for transmitting uplink data according to this embodiment of the present invention, when determining that the resource needed when the uplink data is retransmitted on the unlicensed carrier by using the uplink HARQ mode has not been obtained through contention, the UE performs puncturing processing on the uplink data, so that uplink data can be retransmitted on the unlicensed carrier in the LAA system, an operation is simple, and implementation is easy, thereby improving feasibility and system performance of the LAA system.

Figure 8:
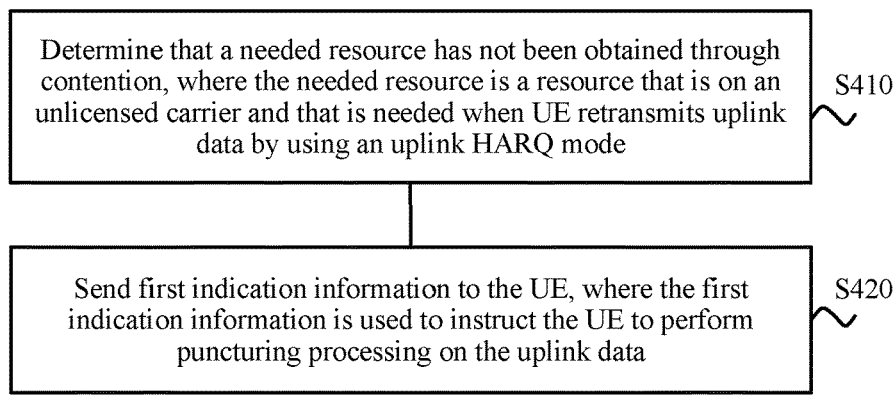
FIG. 8 is a schematic flowchart of a method for transmitting uplink data in an LAA system according to another embodiment of the present invention.

FIG. 8 shows a method 400 for transmitting uplink data in an LAA system according to another embodiment of the present invention. The method 400 may be performed by a network device. The network device may be a base station or another network element. This embodiment of the present invention is not limited thereto. As shown in FIG. 8, the method 400 includes the following steps:

S410. Determine that a needed resource has not been obtained through contention, where the needed resource is a resource that is on an unlicensed carrier and that is needed when UE retransmits uplink data by using an uplink HARQ mode.

S420. Send first indication information to the UE, where the first indication information is used to instruct the UE to perform puncturing processing on the uplink data.

Optionally, the determining that a needed resource has not been obtained through contention in S410 includes: determining that a part of the needed resource has not been obtained through contention.

Correspondingly, the first indication information is specifically used to instruct the UE to perform puncturing processing on the uplink data according to the part that has not been obtained through contention in the needed resource.

In this case, the method 400 further includes: receiving the uplink data on which the puncturing processing has been performed and that is retransmitted by the UE by using a part obtained through contention in the needed resource.

In another optional embodiment, the first indication information is carried in downlink control information; and the first indication information includes at least one of the following fields: a carrier indicator field or a puncturing configuration field, where the carrier indicator field is used to indicate the unlicensed carrier, and the puncturing configuration field is used to indicate a starting puncturing location and a puncturing length.

In another optional embodiment, the determining that a needed resource has not been obtained through contention in S410 includes:

receiving second indication information sent by the UE, where the second indication information is used to indicate that the UE has not obtained the needed resource through contention; and determining, according to the second indication information, that the needed resource has not been obtained through contention.

Therefore, in the method for transmitting uplink data according to this embodiment of the present invention, when determining that the resource needed when the uplink data is retransmitted on the unlicensed carrier by using the uplink HARQ mode has not been obtained through contention, the UE performs puncturing processing on the uplink data, so that uplink data can be retransmitted on the unlicensed carrier in the LAA system, an operation is simple, and implementation is easy, thereby improving feasibility and system performance of the LAA system.

Figure 9:
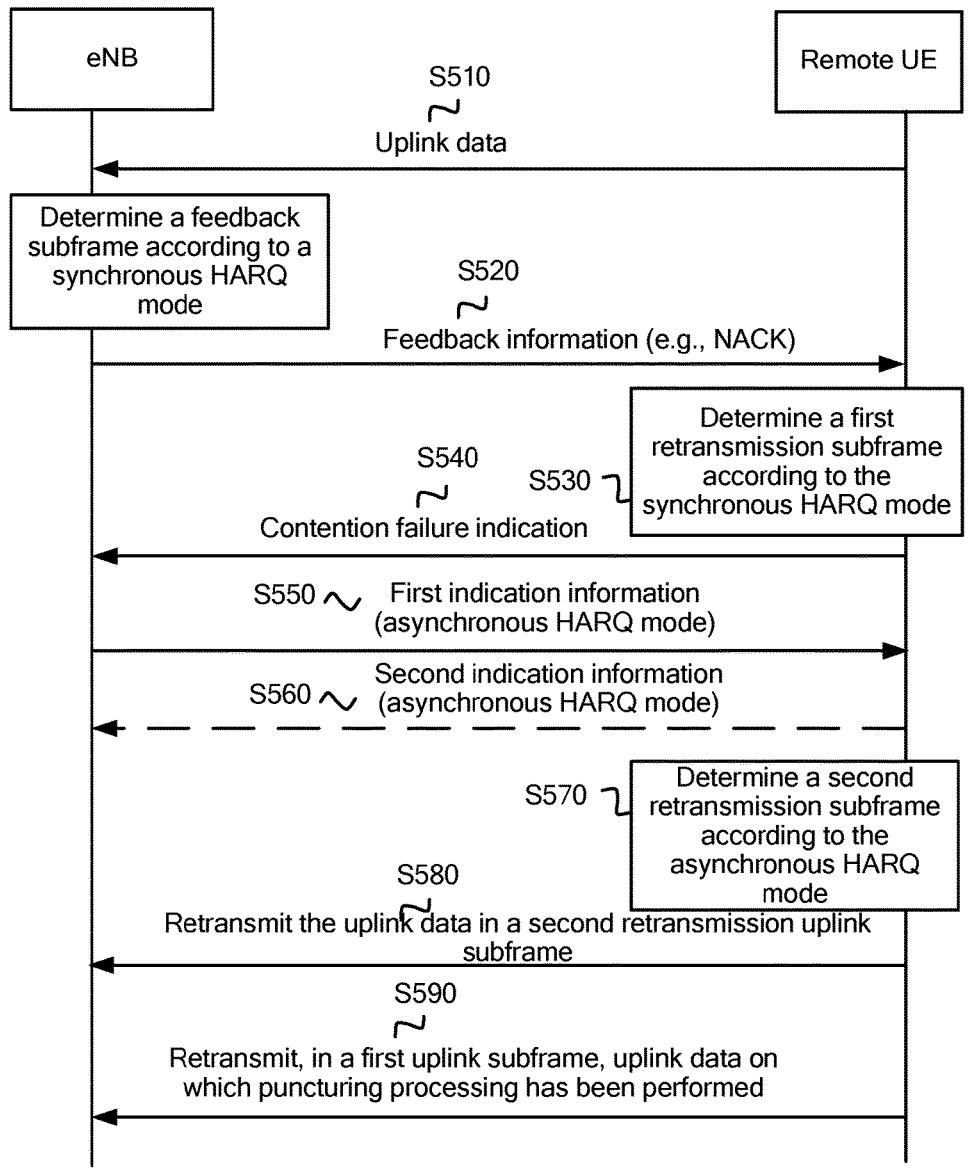
FIG. 9 is a schematic flowchart of a method for transmitting uplink data in an LAA system according to another embodiment of the present invention.

The following describes, in detail with reference to a specific example, the method for transmitting uplink data according to the embodiments of the present invention. FIG. 9 is a schematic flowchart of a method 500 for transmitting uplink data according to another embodiment of the present invention. For ease of description, in this embodiment, it is assumed that a network device is an eNB, a first subframe is a subframe n, a first retransmission subframe is a subframe n+k, and a third subframe is a subframe n+k'. However, this embodiment of the present invention is not limited thereto.

S510. UE transmits uplink data to the eNB in the subframe n by using an unlicensed carrier.

Optionally, the UE may contend for a resource on the unlicensed carrier, and when obtaining a resource in the subframe n on the unlicensed carrier through contention, the UE transmits the uplink data to the eNB in the subframe n by using the unlicensed carrier. In another optional embodiment, the eNB may contend for the resource on the unlicensed carrier, and when obtaining the resource in the subframe n on the unlicensed carrier, the eNB schedules the UE, so that the UE transmits the uplink data to the eNB in the subframe n by using the unlicensed carrier. However, this embodiment of the present invention is not limited thereto.

S520. The eNB determines, according to the synchronous HARQ mode, a feedback subframe corresponding to the subframe n, and sends, to the UE in the feedback subframe, feedback information used to indicate that the eNB does not successfully receive the uplink data.

When receiving the uplink data that is transmitted by the UE in the subframe n by using the unlicensed carrier, the eNB may perform demodulation and checking processing on the uplink data, to determine whether the uplink data is successfully received. The eNB may further determine, according to the synchronous HARQ mode, the feedback subframe corresponding to the subframe n, and send, to the UE in the feedback subframe, feedback information used to indicate whether the uplink data is successfully received. Similarly, the UE may determine, according to the synchronous HARQ mode, a feedback subframe corresponding to the subframe n, and receive, in the feedback subframe, the feedback information sent by the eNB. Optionally, the eNB may send the feedback information to the UE in the feedback subframe by using a licensed carrier, or may send the feedback information by using the unlicensed carrier used for transmitting the uplink data, or may send the feedback information by using another unlicensed carrier other than the unlicensed carrier. This embodiment of the present invention is not limited thereto.

In an optional embodiment, if the eNB determines that the uplink data is successfully received, the eNB may send, to the UE, feedback information used to indicate that the uplink data is successfully received, for example, an acknowledgement (ACK) message. In this case, current data transmission ends. In another optional embodiment, if the eNB determines that the uplink data is not successfully received, the eNB may send, to the UE, the feedback information used to indicate that the uplink data is not successfully received, for example, a non-acknowledgement (NACK) message. In this case, after receiving the feedback information used to indicate that the uplink data is not successfully received, the UE may determine, according to the feedback information, that the uplink data needs to be retransmitted. However, this embodiment of the present invention is not limited thereto.

S530. The UE determines, according to the synchronous HARQ mode, that a first retransmission subframe (that is, a first retransmission subframe corresponding to the subframe n) corresponding to the feedback subframe is a subframe n+k, and contends for a resource in the subframe n+k on the unlicensed carrier.

Optionally, the feedback subframe may be a subframe n+4, and the first retransmission subframe may be a subframe n+8, that is, k=8. However, an interval between the feedback subframe and the subframe n and an interval between the first retransmission subframe and the subframe n are not limited in this embodiment of the present invention.

In an optional embodiment, if the UE has obtained the needed resource in the subframe n+k on the unlicensed carrier through contention, the UE may retransmit the uplink data to the eNB in the subframe n+k by using the unlicensed carrier and according to the synchronous HARQ mode. In another optional embodiment, if the UE has not obtained the needed resource in the subframe n+k on the unlicensed carrier through contention, the UE may determine to switch from the synchronous HARQ mode to an asynchronous HARQ mode, and retransmit the uplink data according to the asynchronous HARQ mode. However, this embodiment of the present invention is not limited thereto.

In an optional example, that the UE has not obtained the needed resource in the subframe n+k on the unlicensed carrier through contention may be: A time resource obtained by the UE on the unlicensed carrier through contention includes only a part of time resource in the subframe n+k, and the UE has not obtained the other part of time resource in the subframe n+k on the unlicensed carrier through contention. The part of time resource obtained by the UE through contention in the subframe n+k is less than a time resource needed for retransmitting the uplink data by using the unlicensed carrier. In this way, the UE may determine to switch from the synchronous HARQ mode to the asynchronous HARQ mode, and perform S570. Alternatively, the UE may perform S590 in the synchronous HARQ mode. The UE may perform S590 provided that the UE has obtained a part of time resource in the subframe n+k on the unlicensed carrier through contention, or perform S590 only when a percentage, in the needed resource, of the resource obtained through contention exceeds a preset threshold, and perform S570 when the percentage, in the needed resource, of the resource obtained through contention does not exceed the preset threshold, to increase a probability that the eNB successfully receives the uplink data. However, this embodiment of the present invention is not limited thereto.

In another optional example, that the UE has not obtained the needed resource in the subframe n+k on the unlicensed carrier through contention may be: The UE has not obtained the resource on the unlicensed carrier through contention, or a resource obtained by the UE through contention on the unlicensed carrier does not include a resource in the subframe n+k, or a resource obtained by the UE through contention in the subframe n+k on the unlicensed carrier is insufficient for retransmitting the uplink data. In this case, the UE may determine to switch from the synchronous HARQ mode to the asynchronous HARQ mode, and perform S570. However, this embodiment of the present invention is not limited thereto.

In this embodiment, after determining that the needed resource in the subframe n+k on the unlicensed carrier has not been obtained through contention, the UE may determine on its own to switch from the synchronous HARQ mode to the asynchronous HARQ mode, that is, perform S560 and S570. Alternatively, the UE may switch from the synchronous HARQ mode to the asynchronous HARQ mode according to an indication of the eNB, that is, perform S540, S550, and S570. This is not limited in this embodiment of the present invention.

S540. The UE sends a contention failure indication to the eNB, where the contention failure indication is used to indicate that the UE has not obtained the needed resource in the first retransmission subframe (the subframe n+k) on the unlicensed carrier through contention.

The UE may send the contention failure indication to the eNB by using the licensed carrier, or may send the contention failure indication by using another unlicensed carrier other than the unlicensed carrier, or may send the contention failure indication by using a time resource obtained through contention on the unlicensed carrier. This is not limited in this embodiment of the present invention.

S550. After receiving the contention failure indication, the eNB determines that the UE needs to perform data retransmission according to an asynchronous HARQ mode, and sends first indication information to the UE, where the first indication information is used to instruct the UE to perform data retransmission according to the asynchronous HARQ mode.

The eNB may send the first indication information to the UE by using the licensed carrier, or send the first indication information by using the unlicensed carrier, or send the first indication information by using another unlicensed carrier other than the licensed carrier. In addition, the first indication information may be carried in DCI or RRC signaling for sending. A format of the DCI may be shown in Table 1. However, this embodiment of the present invention is not limited thereto.

Specifically, if the UE has only one piece of uplink data that needs to be retransmitted by using the asynchronous HARQ mode, that is, the UE needs to retransmit, by using the asynchronous HARQ mode, only uplink data transmitted in one subframe, in S550, the eNB may determine that the UE needs to perform data retransmission according to the asynchronous HARQ mode, and the first indication information may be specifically used to instruct the UE to use the asynchronous HARQ mode. Optionally, the first indication information may occupy one bit. In a specific example, when a value of the bit is set to 0, it indicates that the UE does not switch a HARQ mode or that the UE uses the synchronous HARQ mode. When the value of the bit is set to 1, it indicates that the UE switches a HARQ mode or the UE uses the asynchronous HARQ mode. Alternatively, the opposite case is true. However, a specific implementation of the first indication information is not limited in this embodiment of the present invention.

If the UE has multiple pieces of uplink data that need to be retransmitted by using the asynchronous HARQ mode, and different pieces of uplink data correspond to different transmission subframes, in S550, the eNB may determine that the UE needs to perform data retransmission according to the asynchronous HARQ mode, and further determine a specific HARQ process corresponding to to-be-retransmitted uplink data. In this way, the first indication information may be further used to indicate a HARQ process of which corresponding uplink data is retransmitted by the UE by using the asynchronous HARQ mode. However, a specific implementation of the first indication information is not limited in this embodiment of the present invention.

S560. The UE determines to retransmit the uplink data by using the asynchronous HARQ mode, and sends second indication information to the eNB, where the second indication information is used to indicate that the UE retransmits the uplink data by using the asynchronous HARQ mode.

Optionally, the second indication information may be carried in the UCI for sending. A specific implementation of the second indication information may be similar to that of the first indication information. For brevity, details are not described herein again. After receiving the second indication information, the eNB may determine, according to the asynchronous HARQ mode or according to the asynchronous HARQ mode and a HARQ process number, to receive, in the subframe n+k', the uplink data retransmitted by the UE. However, this embodiment of the present invention is not limited thereto.

S570. The UE determines, according to the asynchronous mode or according to the asynchronous HARQ mode and a HARQ process number, that a second retransmission subframe (that is, a second retransmission subframe corresponding to the subframe n) corresponding to the feedback subframe is a subframe n+k'.

S580. When obtaining the needed resource in the subframe n+k' on the unlicensed carrier through contention, the UE retransmits the uplink data in the subframe n+k' by using the unlicensed carrier.

k' may be greater than or less than k. However, a difference between k' and k is not limited in this embodiment of the present invention. Optionally, in S580, if the UE has obtained the needed resource in the subframe n+k' on the unlicensed carrier through contention, the UE may directly perform data retransmission in the subframe n+k' by using the unlicensed carrier. If the UE has not obtained the needed resource in the subframe n+k' on the unlicensed carrier through contention, the UE may contend for the resource, and when obtaining the needed resource in the subframe n+k' on the unlicensed carrier through contention, the UE retransmits the uplink data by using the resource obtained through contention in the subframe n+k' on the unlicensed carrier. However, this embodiment of the present invention is not limited thereto.

S590. The UE performs puncturing processing on the uplink data, and retransmits, in the subframe n+k by using the unlicensed carrier, the uplink data on which the puncturing processing has been performed.

Specifically, the UE may perform puncturing processing on data, corresponding to the resource that has not been obtained through contention, in the uplink data. However, this embodiment of the present invention is not limited thereto.

Therefore, in the method for transmitting uplink data in an LAA system according to this embodiment of the present invention, the synchronous HARQ mode and the asynchronous HARQ mode are configured for uplink transmission of the user equipment on the unlicensed carrier, so that when performing specific uplink transmission on the unlicensed carrier, the user equipment may determine to use the synchronous HARQ mode or the asynchronous HARQ mode, thereby avoiding a problem that the UE cannot perform retransmission because a time resource obtained by the UE through contention on the unlicensed carrier is limited, and improving flexibility of performing uplink transmission on the unlicensed carrier by the UE. In addition, the network device can combine received uplink data that the UE sends for multiple times, thereby improving data transmission performance and overall system performance.

It should be noted that the example in FIG. 9 is to help a person skilled in the art to better understand the embodiments of the present invention, instead of limiting the scope of the embodiments of the present invention. A person skilled in the art may obviously make any equivalent modification or change according to the example in FIG. 9, and the modification or change also falls within the scope of the embodiments of the present invention.

It should be understood that sequence numbers of the processes do not represent an execution sequence. The execution sequence of the processes should be determined according to the functions and internal logic. The sequence numbers should not constitute any limitation on the implementation processes of the embodiments of the present invention.

The foregoing describes, in detail with reference to FIG. 2 to FIG. 9, the method for transmitting uplink data in an LAA system according to the embodiments of the present invention. The following describes, with reference to FIG.

Figure 17:
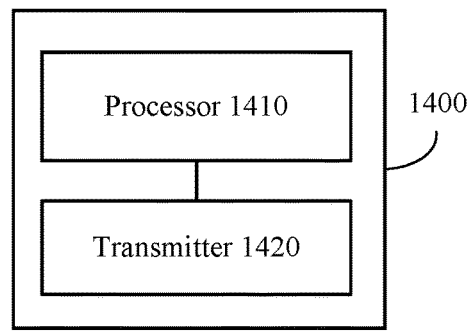
FIG. 17 is a schematic block diagram of an apparatus for transmitting uplink data in an LAA system according to another embodiment of the present invention.

10 to FIG. 17, an apparatus for transmitting uplink data in an LAA system according to the embodiments of the present invention.

Figure 10:
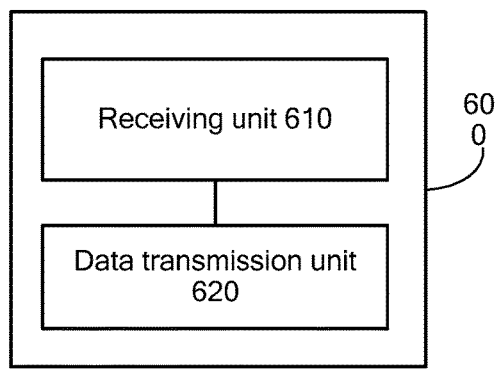
FIG. 10 is a schematic block diagram of an apparatus for transmitting uplink data in an LAA system according to an embodiment of the present invention.

FIG. 10 shows an apparatus 600 for transmitting uplink data in an LAA system according to an embodiment of the present invention. The apparatus 600 includes:

a receiving unit 610, configured to receive mode configuration indication information sent by a network device, where the mode configuration indication information is used to indicate that a synchronous hybrid automatic repeat request HARQ mode and an asynchronous HARQ mode are configured for uplink transmission of user equipment on an unlicensed carrier; and a data transmission unit 620, configured to perform uplink transmission on the unlicensed carrier by using the synchronous HARQ mode or the asynchronous HARQ mode and according to the mode configuration indication information received by the receiving unit 610.

Optionally, the mode configuration indication information is further used to indicate mode switching between the synchronous HARQ mode and the asynchronous HARQ mode.

Optionally, the receiving unit 610 is specifically configured to:

receive a system message sent by the network device, where the system message carries the mode configuration indication information; or receive RRC signaling sent by the network device, where the RRC signaling carries the mode configuration indication information; or receive DCI sent by the network device, where the DCI carries the mode configuration indication information.

In another optional embodiment, the apparatus 600 further includes a determining unit, configured to determine that a needed resource has not been obtained through contention; and correspondingly, the data transmission unit 620 is specifically configured to: when the determining unit determines that the needed resource has not been obtained through contention, retransmit uplink data by using the asynchronous HARQ mode, where the needed resource is a resource that is on the unlicensed carrier and that is needed when the uplink data is retransmitted according to the synchronous HARQ mode.

In another optional embodiment, the determining unit is further configured to determine to retransmit the uplink data by using the asynchronous HARQ mode when determining that the needed resource has not been obtained through contention; and correspondingly, the apparatus 600 further includes a sending unit, configured to send first indication information to the network device, where the first indication information is used to indicate that the user equipment retransmits the uplink data by using the asynchronous HARQ mode.

In another optional embodiment, the receiving unit 610 is further configured to: before the data transmission unit 620 retransmits the uplink data by using the asynchronous HARQ mode, receive second indication information that is sent by the network device when the network device determines that the needed resource has not been obtained through contention, where the second indication information is used to instruct the user equipment to retransmit the uplink data by using the asynchronous HARQ mode; and correspondingly, the determining unit is further configured to determine, according to the second indication information received by the receiving unit 610, to retransmit the uplink data by using the asynchronous HARQ mode.

In another optional embodiment, the second indication information is carried in downlink control information; and the second indication information includes at least one of the following fields: a HARQ mode field or a HARQ mapping field, where the HARQ mode field is used to indicate that the synchronous HARQ mode or the asynchronous HARQ mode is used, and the HARQ mapping field is used to indicate a HARQ process number corresponding to the uplink data.

In another optional embodiment, the receiving unit 610 is further configured to receive third indication information sent by the network device, where the third indication information is used to indicate that the network device has not obtained the needed resource through contention; and correspondingly, the determining unit is specifically configured to determine, according to the third indication information received by the receiving unit 610, that the needed resource has not been obtained through contention.

In another optional embodiment, the determining unit is further configured to determine a percentage, in the needed resource, a part that has not been obtained through contention in the needed resource; and correspondingly, the data transmission unit 620 is specifically configured to retransmit the uplink data by using the asynchronous HARQ mode when the determining unit determines that the percentage, in the needed resource, of the part that has not been obtained through contention in the needed resource exceeds a threshold.

In this case, the data transmission unit 620 is further configured to retransmit the uplink data by using the synchronous HARQ mode when the determining unit determines that the percentage, in the needed resource, of the part that has not been obtained through contention in the needed resource is less than the threshold.

In another optional embodiment, the data transmission unit 620 is specifically configured to: when the determining unit determines that the percentage, in the needed resource, of the part that has not been obtained through contention in the needed resource is less than the threshold, perform puncturing processing on the uplink data according to the part that has not been obtained through contention in the needed resource.

The apparatus 600 for transmitting uplink data according to this embodiment of the present invention may correspond to the UE in the method for transmitting uplink data according to the embodiments of the present invention, and the modules in the apparatus 600 and other operations and/or functions are respectively intended to implement the corresponding processes of the methods in FIG. 2 to FIG. 9. For brevity, details are not described herein again.

Therefore, in the apparatus for transmitting uplink data in an LAA system according to this embodiment of the present invention, the synchronous HARQ mode and the asynchronous HARQ mode are configured for uplink transmission of the user equipment on the unlicensed carrier, so that when performing specific uplink transmission on the unlicensed carrier, the user equipment may determine to use the synchronous HARQ mode or the asynchronous HARQ mode, thereby avoiding a problem that the UE cannot perform retransmission because a time resource obtained by the UE through contention on the unlicensed carrier is limited, and improving flexibility of performing uplink transmission on the unlicensed carrier by the UE. In addition, the network device can combine received uplink data that the UE sends for multiple times, thereby improving data transmission performance and overall system performance.

Figure 11:
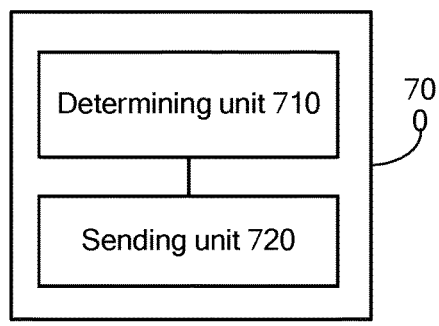
FIG. 11 is a schematic block diagram of an apparatus for transmitting uplink data in an LAA system according to another embodiment of the present invention.

FIG. 11 shows an apparatus 700 for transmitting uplink data in an LAA system according to another embodiment of the present invention. The apparatus 700 includes:

a determining unit 710, configured to determine to configure a synchronous hybrid automatic repeat request HARQ mode and an asynchronous HARQ mode for uplink transmission of user equipment on an unlicensed carrier; and a sending unit 720, configured to send mode configuration indication information to the user equipment, where the mode configuration indication information is used to indicate that the determining unit 710 determines to configure the synchronous HARQ mode and the asynchronous HARQ mode for uplink transmission on the unlicensed carrier, so that the user equipment performs uplink transmission on the unlicensed carrier by using the synchronous HARQ mode or the asynchronous HARQ mode.

Optionally, the mode configuration indication information is further used to indicate mode switching between the synchronous HARQ mode and the asynchronous HARQ mode.

Optionally, the sending unit 720 is specifically configured to:

send a system message to the user equipment, where the system message carries the mode configuration indication information; or send RRC signaling to the user equipment, where the RRC signaling carries the mode configuration indication information; or send DCI to the user equipment, where the DCI carries the mode configuration indication information.

In another optional embodiment, the determining unit 710 is further configured to determine to receive, by using the asynchronous HARQ mode, uplink data that is retransmitted by the user equipment on the unlicensed carrier.

In another optional embodiment, the apparatus 700 further includes a receiving unit, configured to receive first indication information sent by the user equipment, where the first indication information is used to indicate that the user equipment retransmits the uplink data by using the asynchronous HARQ mode; and correspondingly, the determining unit 710 is specifically configured to determine, according to the first indication information received by the receiving unit, to receive, by using the asynchronous HARQ mode, the uplink data that is retransmitted by the user equipment on the unlicensed carrier.

In another optional embodiment, the determining unit 710 is specifically configured to: when determining that a needed resource has not been obtained through contention, determine to receive, by using the asynchronous HARQ mode, the uplink data that is retransmitted by the user equipment on the unlicensed carrier, where the needed resource is a resource that is on the unlicensed carrier and that is needed when the uplink data is retransmitted by using the synchronous HARQ mode; and correspondingly, the sending unit 720 is further configured to send second indication information to the user equipment, where the second indication information is used to instruct to retransmit the uplink data by using the asynchronous HARQ mode.

In another optional embodiment, the second indication information is carried in downlink control information; and the second indication information includes at least one of the following fields: a HARQ mode field or a HARQ mapping field, where the HARQ mode field is used to indicate the synchronous HARQ mode or the asynchronous HARQ mode, and the HARQ mapping field is used to indicate a HARQ process number.

In another optional embodiment, the determining unit 710 is specifically configured to: when determining that a percentage, in the needed resource, of a part that has not been obtained through contention in the needed resource exceeds a threshold, determine to receive, by using the asynchronous HARQ mode, the uplink data that is retransmitted by the user equipment on the unlicensed carrier.

In this case, the determining unit 710 is further configured to: when determining that a percentage, in the needed resource, of a part that has not been obtained through contention in the needed resource is less than the threshold, determine to receive, by using the synchronous HARQ mode, the uplink data that is retransmitted by the user equipment on the unlicensed carrier.

The apparatus 700 for transmitting uplink data according to this embodiment of the present invention may correspond to the network device in the method for transmitting uplink data according to the embodiments of the present invention, and the modules in the apparatus 700 and other operations and/or functions are respectively intended to implement the corresponding processes of the methods in FIG. 2 to FIG. 9. For brevity, details are not described herein again.

Therefore, in the apparatus for transmitting uplink data in an LAA system according to this embodiment of the present invention, the synchronous HARQ mode and the asynchronous HARQ mode are configured for uplink transmission of the user equipment on the unlicensed carrier, so that when performing specific uplink transmission on the unlicensed carrier, the user equipment may determine to use the synchronous HARQ mode or the asynchronous HARQ mode, thereby avoiding a problem that the UE cannot perform retransmission because a time resource obtained by the UE through contention on the unlicensed carrier is limited, and improving flexibility of performing uplink transmission on the unlicensed carrier by the UE. In addition, the network device can combine received uplink data that the UE sends for multiple times, thereby improving data transmission performance and overall system performance.

Figure 12:
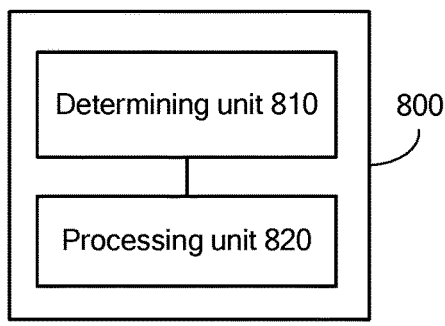
FIG. 12 is a schematic block diagram of an apparatus for transmitting uplink data in an LAA system according to another embodiment of the present invention.

FIG. 12 shows an apparatus 800 for transmitting uplink data in an LAA system according to another embodiment of the present invention. The apparatus 800 includes:

a determining unit 810, configured to determine that a needed resource has not been obtained through contention, where the needed resource is a resource that is on an unlicensed carrier and that is needed when user equipment retransmits uplink data by using an uplink HARQ mode; and a processing unit 820, configured to perform puncturing processing on the uplink data when the determining unit 810 determines that the needed resource has not been obtained through contention.

In an optional embodiment, the determining unit 810 is specifically configured to determine that a part of the needed resource has not been obtained through contention; and correspondingly, the processing unit 820 is specifically configured to perform puncturing processing on the uplink data according to the part that has not been obtained through contention in the needed resource.

In this case, the apparatus 800 further includes a sending unit, configured to retransmit the uplink data on which the processing unit 820 has performed the puncturing processing to a network device by using a part obtained through contention in the needed resource.

In another optional embodiment, the apparatus 800 further includes a receiving unit, configured to: before the processing unit 820 performs puncturing processing on the uplink data, receive indication information sent by the network device, where the indication information is used to instruct to perform puncturing processing on the uplink data; and correspondingly, the processing unit 820 is specifically configured to perform puncturing processing on the uplink data according to the indication information received by the receiving unit.

In another optional embodiment, the indication information is carried in downlink control information; and the indication information includes at least one of the following fields: a carrier indicator field or a puncturing configuration field, where the carrier indicator field is used to indicate the unlicensed carrier, and the puncturing configuration field is used to indicate a starting puncturing location and a puncturing length.

The apparatus 800 for transmitting uplink data according to this embodiment of the present invention may correspond to the UE in the method for transmitting uplink data according to the embodiments of the present invention, and the modules in the apparatus 800 and other operations and/or functions are respectively intended to implement the corresponding processes of the methods in FIG. 2 to FIG. 9. For brevity, details are not described herein again.

Therefore, in the apparatus for transmitting uplink data according to this embodiment of the present invention, when determining that the resource needed when the uplink data is retransmitted on the unlicensed carrier by using the uplink HARQ mode has not been obtained through contention, the UE performs puncturing processing on the uplink data, so that uplink data can be retransmitted on the unlicensed carrier in the LAA system, an operation is simple, and implementation is easy, thereby improving feasibility and system performance of the LAA system.

Figure 13:
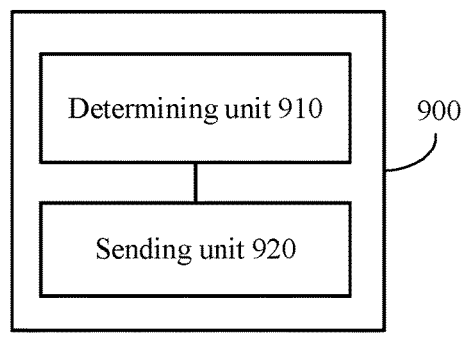
FIG. 13 is a schematic block diagram of an apparatus for transmitting uplink data in an LAA system according to another embodiment of the present invention.

FIG. 13 shows an apparatus 900 for transmitting uplink data in an LAA system according to another embodiment of the present invention. The apparatus 900 includes:

a determining unit 910, configured to determine that a needed resource has not been obtained through contention, where the needed resource is a resource that is on an unlicensed carrier and that is needed when user equipment retransmits uplink data by using an uplink HARQ mode; and a sending unit 920, configured to send first indication information to the user equipment when the determining unit 910 determines that the needed resource has not been obtained through contention, where the first indication information is used to instruct the user equipment to perform puncturing processing on the uplink data.

In an optional embodiment, the determining unit 910 is specifically configured to determine that a part of the needed resource has not been obtained through contention; and correspondingly, the first indication information is specifically used to instruct the user equipment to perform puncturing processing on the uplink data according to the part that has not been obtained through contention in the needed resource.

In this case, the apparatus 900 further includes a first receiving unit, configured to receive the uplink data on which the puncturing processing has been performed and that is retransmitted by the user equipment by using a part obtained through contention in the needed resource.

In another optional embodiment, the first indication information is carried in downlink control information; and the first indication information includes at least one of the following fields: a carrier indicator field or a puncturing configuration field, where the carrier indicator field is used to indicate the unlicensed carrier, and the puncturing configuration field is used to indicate a starting puncturing location and a puncturing length.

In another optional embodiment, the apparatus 900 further includes a second receiving unit, configured to: before the determining unit 910 determines that the needed resource has not been obtained through contention, receive second indication information sent by the user equipment, where the second indication information is used to indicate that the user equipment has not obtained the needed resource through contention; and correspondingly, the determining unit 910 is specifically configured to determine, according to the second indication information received by the second receiving unit, that the needed resource has not been obtained through contention.

The apparatus 900 for transmitting uplink data according to this embodiment of the present invention may correspond to the UE in the method for transmitting uplink data according to the embodiments of the present invention, and the modules in the apparatus 900 and other operations and/or functions are respectively intended to implement the corresponding processes of the methods in FIG. 2 to FIG. 9. For brevity, details are not described herein again.

Therefore, in the apparatus for transmitting uplink data according to this embodiment of the present invention, when determining that the resource needed when the uplink data is retransmitted on the unlicensed carrier by using the uplink HARQ mode has not been obtained through contention, the UE performs puncturing processing on the uplink data, so that uplink data can be retransmitted on the unlicensed carrier in the LAA system, an operation is simple, and implementation is easy, thereby improving feasibility and system performance of the LAA system.

Figure 14:
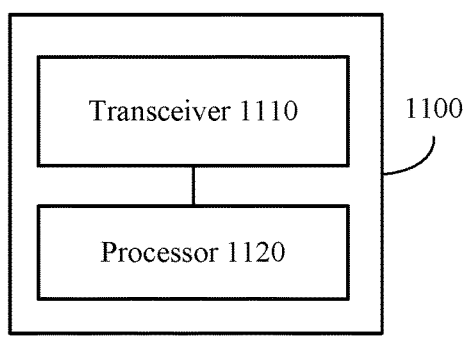
FIG. 14 is a schematic block diagram of an apparatus for transmitting uplink data in an LAA system according to another embodiment of the present invention.

FIG. 14 shows an apparatus 1100 for transmitting uplink data in an LAA system according to an embodiment of the present invention. The apparatus 1100 includes a transceiver 1110, configured to:

receive mode configuration indication information sent by a network device, where the mode configuration indication information is used to indicate that a synchronous hybrid automatic repeat request HARQ mode and an asynchronous HARQ mode are configured for uplink transmission of user equipment on an unlicensed carrier; and perform uplink transmission on the unlicensed carrier by using the synchronous HARQ mode or the asynchronous HARQ mode and according to the mode configuration indication information.

Optionally, the mode configuration indication information is further used to indicate mode switching between the synchronous HARQ mode and the asynchronous HARQ mode.

Optionally, the transceiver 1110 is specifically configured to:

receive a system message sent by the network device, where the system message carries the mode configuration indication information; or receive RRC signaling sent by the network device, where the RRC signaling carries the mode configuration indication information; or receive DCI sent by the network device, where the DCI carries the mode configuration indication information.

In another optional embodiment, as shown in FIG. 14, the apparatus 1100 further includes a processor 1120, configured to determine that a needed resource has not been obtained through contention; and correspondingly, the transceiver 1110 is specifically configured to: when the processor 1120 determines that the needed resource has not been obtained through contention, retransmit uplink data by using the asynchronous HARQ mode, where the needed resource is a resource that is on the unlicensed carrier and that is needed when the uplink data is retransmitted according to the synchronous HARQ mode.

In another optional embodiment, the processor 1120 is further configured to determine to retransmit the uplink data by using the asynchronous HARQ mode when determining that the needed resource has not been obtained through contention; and correspondingly, the transceiver 1110 is further configured to send first indication information to the network device, where the first indication information is used to indicate that the user equipment retransmits the uplink data by using the asynchronous HARQ mode.

In another optional embodiment, the transceiver 1110 is further configured to: before retransmitting the uplink data by using the asynchronous HARQ mode, receive second indication information that is sent by the network device when the network device determines that the needed resource has not been obtained through contention, where the second indication information is used to instruct the user equipment to retransmit the uplink data by using the asynchronous HARQ mode; and correspondingly, the processor 1120 is further configured to determine, according to the second indication information received by the transceiver 1110, to retransmit the uplink data by using the asynchronous HARQ mode.

In another optional embodiment, the second indication information is carried in downlink control information; and the second indication information includes at least one of the following fields: a HARQ mode field or a HARQ mapping field, where the HARQ mode field is used to indicate that the synchronous HARQ mode or the asynchronous HARQ mode is used, and the HARQ mapping field is used to indicate a HARQ process number corresponding to the uplink data.

In another optional embodiment, the transceiver 1110 is further configured to receive third indication information sent by the network device, where the third indication information is used to indicate that the network device has not obtained the needed resource through contention; and correspondingly, the processor 1120 is specifically configured to determine, according to the third indication information received by the transceiver 1110, that the needed resource has not been obtained through contention.

In another optional embodiment, the processor 1120 is further configured to determine a percentage, in the needed resource, a part that has not been obtained through contention in the needed resource; and correspondingly, the transceiver 1110 is specifically configured to retransmit the uplink data by using the asynchronous HARQ mode when the processor 1120 determines that the percentage, in the needed resource, of the part that has not been obtained through contention in the needed resource exceeds a threshold.

In this case, the transceiver 1110 is further configured to retransmit the uplink data by using the synchronous HARQ mode when the processor 1120 determines that the percentage, in the needed resource, of the part that has not been obtained through contention in the needed resource is less than the threshold.

In another optional embodiment, the transceiver 1110 is specifically configured to: when the processor 1120 determines that the percentage, in the needed resource, of the part that has not been obtained through contention in the needed resource is less than the threshold, perform puncturing processing on the uplink data according to the part that has not been obtained through contention in the needed resource.

The apparatus 1100 for transmitting uplink data according to this embodiment of the present invention may correspond to the UE in the method for transmitting uplink data according to the embodiments of the present invention, and the modules in the apparatus 1100 and other operations and/or functions are respectively intended to implement the corresponding processes of the methods in FIG. 2 to FIG. 9. For brevity, details are not described herein again.

Therefore, in the apparatus for transmitting uplink data in an LAA system according to this embodiment of the present invention, the synchronous HARQ mode and the asynchronous HARQ mode are configured for uplink transmission of the user equipment on the unlicensed carrier, so that when performing specific uplink transmission on the unlicensed carrier, the user equipment may determine to use the synchronous HARQ mode or the asynchronous HARQ mode, thereby avoiding a problem that the UE cannot perform retransmission because a time resource obtained by the UE through contention on the unlicensed carrier is limited, and improving flexibility of performing uplink transmission on the unlicensed carrier by the UE. In addition, the network device can combine received uplink data that the UE sends for multiple times, thereby improving data transmission performance and overall system performance.

Figure 15:
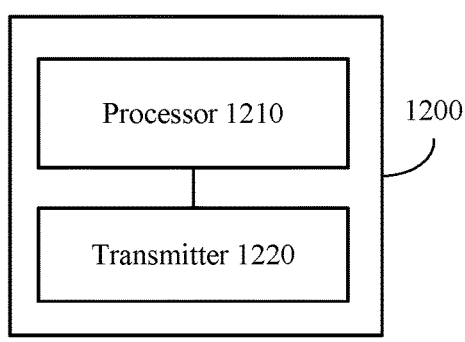
FIG. 15 is a schematic block diagram of an apparatus for transmitting uplink data in an LAA system according to another embodiment of the present invention.

FIG. 15 shows an apparatus 1200 for transmitting uplink data in an LAA system according to another embodiment of the present invention. The apparatus 1200 includes:

a processor 1210, configured to determine to configure a synchronous hybrid automatic repeat request HARQ mode and an asynchronous HARQ mode for uplink transmission of user equipment on an unlicensed carrier; and a transmitter 1220, configured to send mode configuration indication information to the user equipment, where the mode configuration indication information is used to indicate that the processor 1210 determines to configure the synchronous HARQ mode and the asynchronous HARQ mode for uplink transmission on the unlicensed carrier, so that the user equipment performs uplink transmission on the unlicensed carrier by using the synchronous HARQ mode or the asynchronous HARQ mode.

Optionally, the mode configuration indication information is further used to indicate mode switching between the synchronous HARQ mode and the asynchronous HARQ mode.

Optionally, the transmitter 1220 is specifically configured to:

send a system message to the user equipment, where the system message carries the mode configuration indication information; or send RRC signaling to the user equipment, where the RRC signaling carries the mode configuration indication information; or send DCI to the user equipment, where the DCI carries the mode configuration indication information.

In another optional embodiment, the processor 1210 is further configured to determine to receive, by using the asynchronous HARQ mode, uplink data that is retransmitted by the user equipment on the unlicensed carrier.

In another optional embodiment, the apparatus 1200 further includes a receiver, configured to receive first indication information sent by the user equipment, where the first indication information is used to indicate that the user equipment retransmits the uplink data by using the asynchronous HARQ mode; and correspondingly, the processor 1210 is specifically configured to determine, according to the first indication information received by the receiver, to receive, by using the asynchronous HARQ mode, the uplink data that is retransmitted by the user equipment on the unlicensed carrier.

In another optional embodiment, the processor 1210 is specifically configured to: when determining that a needed resource has not been obtained through contention, determine to receive, by using the asynchronous HARQ mode, the uplink data that is retransmitted by the user equipment on the unlicensed carrier, where the needed resource is a resource that is on the unlicensed carrier and that is needed when the uplink data is retransmitted by using the synchronous HARQ mode; and correspondingly, the transmitter 1220 is further configured to send second indication information to the user equipment, where the second indication information is used to instruct to retransmit the uplink data by using the asynchronous HARQ mode.

In another optional embodiment, the second indication information is carried in downlink control information; and the second indication information includes at least one of the following fields: a HARQ mode field or a HARQ mapping field, where the HARQ mode field is used to indicate the synchronous HARQ mode or the asynchronous HARQ mode, and the HARQ mapping field is used to indicate a HARQ process number.

In another optional embodiment, the processor 1210 is specifically configured to: when it is determined that a percentage, in the needed resource, of a part that has not been obtained through contention in the needed resource exceeds a threshold, determine to receive, by using the asynchronous HARQ mode, the uplink data that is retransmitted by the user equipment on the unlicensed carrier.

In this case, the processor 1210 is further configured to: when it is determined that a percentage, in the needed resource, of a part that has not been obtained through contention in the needed resource is less than the threshold, determine to receive, by using the synchronous HARQ mode, the uplink data that is retransmitted by the user equipment on the unlicensed carrier.

The apparatus 1200 for transmitting uplink data according to this embodiment of the present invention may correspond to the network device in the method for transmitting uplink data according to the embodiments of the present invention, and the modules in the apparatus 1200 and other operations and/or functions are respectively intended to implement the corresponding processes of the methods in FIG. 2 to FIG. 9. For brevity, details are not described herein again.

Therefore, in the apparatus for transmitting uplink data in an LAA system according to this embodiment of the present invention, the synchronous HARQ mode and the asynchronous HARQ mode are configured for uplink transmission of the user equipment on the unlicensed carrier, so that when performing specific uplink transmission on the unlicensed carrier, the user equipment may determine to use the synchronous HARQ mode or the asynchronous HARQ mode, thereby avoiding a problem that the UE cannot perform retransmission because a time resource obtained by the UE through contention on the unlicensed carrier is limited, and improving flexibility of performing uplink transmission on the unlicensed carrier by the UE. In addition, the network device can combine received uplink data that the UE sends for multiple times, thereby improving data transmission performance and overall system performance.

Figure 16:
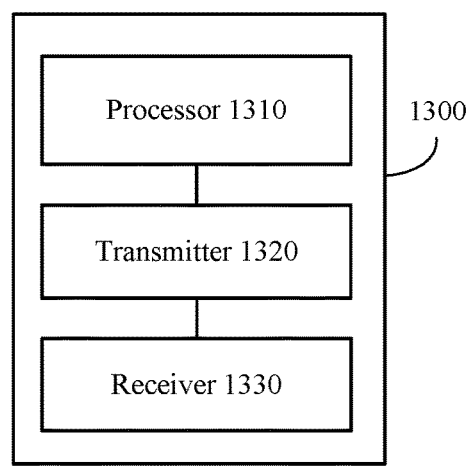
FIG. 16 is a schematic block diagram of an apparatus for transmitting uplink data in an LAA system according to another embodiment of the present invention.

FIG. 16 shows an apparatus 1300 for transmitting uplink data in an LAA system according to another embodiment of the present invention. The apparatus 1300 includes a processor 1310, configured to:

determine that a needed resource has not been obtained through contention, where the needed resource is a resource that is on an unlicensed carrier and that is needed when user equipment retransmits uplink data by using an uplink hybrid automatic repeat request HARQ mode; and perform puncturing processing on the uplink data.

In an optional embodiment, the processor 1310 is specifically configured to determine that a part of the needed resource has not been obtained through contention; and correspondingly, the processor 1310 is specifically configured to perform puncturing processing on the uplink data according to the part that has not been obtained through contention in the needed resource.

In this case, as shown in FIG. 16, the apparatus 1300 further includes a transmitter 1320, configured to retransmit the uplink data on which the processor 1310 has performed the puncturing processing to a network device by using a part obtained through contention in the needed resource.

In another optional embodiment, as shown in FIG. 16, the apparatus 1300 further includes a receiver 1330, configured to: before the processor 1310 performs puncturing processing on the uplink data, receive indication information sent by the network device, where the indication information is used to instruct to perform puncturing processing on the uplink data; and correspondingly, the processor 1310 is specifically configured to perform puncturing processing on the uplink data according to the indication information received by the receiver 1330.

In another optional embodiment, the indication information is carried in downlink control information; and the indication information includes at least one of the following fields: a carrier indicator field or a puncturing configuration field, where the carrier indicator field is used to indicate the unlicensed carrier, and the puncturing configuration field is used to indicate a starting puncturing location and a puncturing length.

The apparatus 1300 for transmitting uplink data according to this embodiment of the present invention may correspond to the UE in the method for transmitting uplink data according to the embodiments of the present invention, and the modules in the apparatus 1300 and other operations and/or functions are respectively intended to implement the corresponding processes of the methods in FIG. 2 to FIG. 9. For brevity, details are not described herein again.

Therefore, in the apparatus for transmitting uplink data according to this embodiment of the present invention, when determining that the resource needed when the uplink data is retransmitted on the unlicensed carrier by using the uplink HARQ mode has not been obtained through contention, the UE performs puncturing processing on the uplink data, so that uplink data can be retransmitted on the unlicensed carrier in the LAA system, an operation is simple, and implementation is easy, thereby improving feasibility and system performance of the LAA system.

FIG. 17 shows an apparatus 1400 for transmitting uplink data in an LAA system according to another embodiment of the present invention. The apparatus 1400 includes:

a processor 1410, configured to determine that a needed resource has not been obtained through contention, where the needed resource is a resource that is on an unlicensed carrier and that is needed when user equipment retransmits uplink data by using an uplink HARQ mode; and a transmitter 1420, configured to send first indication information to the user equipment when the processor 1410 determines that the needed resource has not been obtained through contention, where the first indication information is used to instruct the user equipment to perform puncturing processing on the uplink data.

In an optional embodiment, the processor 1410 is specifically configured to determine that a part of the needed resource has not been obtained through contention; and correspondingly, the first indication information is specifically used to instruct the user equipment to perform puncturing processing on the uplink data according to the part that has not been obtained through contention in the needed resource.

In this case, the apparatus 1400 further includes a receiver, configured to receive the uplink data on which the puncturing processing has been performed and that is retransmitted by the user equipment by using a part obtained through contention in the needed resource.

In another optional embodiment, the first indication information is carried in downlink control information; and the first indication information includes at least one of the following fields: a carrier indicator field or a puncturing configuration field, where the carrier indicator field is used to indicate the unlicensed carrier, and the puncturing configuration field is used to indicate a starting puncturing location and a puncturing length.

In another optional embodiment, the apparatus 1400 further includes a receiver, configured to: before the processor 1410 determines that the needed resource has not been obtained through contention, receive second indication information sent by the user equipment, where the second indication information is used to indicate that the user equipment has not obtained the needed resource through contention; and correspondingly, the processor 1410 is specifically configured to determine, according to the second indication information received by the second receiver, that the needed resource has not been obtained through contention.

The apparatus 1400 for transmitting uplink data according to this embodiment of the present invention may correspond to the UE in the method for transmitting uplink data according to the embodiments of the present invention, and the modules in the apparatus 1400 and other operations and/or functions are respectively intended to implement the corresponding processes of the methods in FIG. 2 to FIG. 9. For brevity, details are not described herein again.

Therefore, in the apparatus for transmitting uplink data according to this embodiment of the present invention, when determining that the resource needed when the uplink data is retransmitted on the unlicensed carrier by using the uplink HARQ mode has not been obtained through contention, the UE performs puncturing processing on the uplink data, so that uplink data can be retransmitted on the unlicensed carrier in the LAA system, an operation is simple, and implementation is easy, thereby improving feasibility and system performance of the LAA system.

It should be understood that in the embodiment of the present invention, the processor may be a central processing unit (Central Processing Unit, "CPU" for short), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor or the processor may be any conventional processor, or the like.

The foregoing apparatus may further include a memory. The memory may include a read-only memory and a random access memory, and provide an instruction and data for the processor. A part of the memory may further include a non-volatile random access memory. For example, the memory may further store information about a device type.

In an implementation process, steps in the foregoing methods can be implemented by using a hardware integrated logical circuit in the processor, or by using instructions in a form of software. The steps of the methods disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

It should be understood that, the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for ease and brevity of description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optional disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
receiving, by a terminal, mode configuration indication information sent by a network device, wherein the mode configuration indication information is used to indicate that a synchronous hybrid automatic repeat request (HARQ) mode and an asynchronous HARQ mode are configured for uplink transmission of the terminal on an unlicensed carrier; and
performing, by the terminal according to the mode configuration indication information, uplink transmission on the unlicensed carrier using the synchronous HARQ mode or the asynchronous HARQ mode, wherein the performing includes retransmitting, by the terminal, uplink data using the asynchronous HARQ mode when a needed resource has not been obtained through contention, wherein the needed resource is a resource that is on the unlicensed carrier and that is needed when the uplink data is retransmitted according to the synchronous HARQ mode;
wherein before retransmitting uplink data using the asynchronous HARQ mode, the method further comprises:

determining, by the terminal, to retransmit the uplink data using the asynchronous HARQ mode, when the needed resource has not been obtained through contention; and
sending, by the terminal, first indication information to the network device, wherein the first indication information is used to indicate that the terminal retransmits the uplink data using the asynchronous HARQ mode.

2. The method according to claim 1, wherein the mode configuration indication information is further used to indicate mode switching between the synchronous HARQ mode and the asynchronous HARQ mode.

3. The method according to claim 1, wherein the receiving mode configuration indication information sent by a network device comprises:
receiving, by the terminal, a system message sent by the network device, wherein the system message carries the mode configuration indication information; or
receiving, by the terminal, radio resource control (RRC) signaling sent by the network device, wherein the RRC signaling carries the mode configuration indication information; or
receiving, by the terminal, downlink control information (DCI) sent by the network device, wherein the DCI carries the mode configuration indication information.

4. A method comprising:
receiving, by a terminal, mode configuration indication information sent by a network device, wherein the mode configuration indication information is used to indicate that a synchronous hybrid automatic repeat request (HARQ) mode and an asynchronous HARQ mode are configured for uplink transmission of the terminal on an unlicensed carrier; and
performing, by the terminal according to the mode configuration indication information, uplink transmission on the unlicensed carrier using the synchronous HARQ mode or the asynchronous HARQ mode, wherein the performing includes retransmitting, by the terminal, uplink data using the asynchronous HARQ mode when a needed resource has not been obtained through contention, wherein the needed resource is a resource that is on the unlicensed carrier and that is needed when the uplink data is retransmitted according to the synchronous HARQ mode;
wherein before retransmitting uplink data using the asynchronous HARQ mode, the method further comprises:
receiving, by the terminal, second indication information that is sent by the network device when the network device determines that the needed resource has not been obtained through contention, wherein the second indication information is used to instruct the terminal to retransmit the uplink data using the asynchronous HARQ mode; and
determining, by the terminal according to the second indication information, to retransmit the uplink data using the asynchronous HARQ mode.

5. The method according to claim 4, wherein the second indication information is carried in downlink control information; and
the second indication information comprises at least one of the following fields: a HARQ mode field or a HARQ mapping field, wherein the HARQ mode field is used to indicate that the synchronous HARQ mode or the asynchronous HARQ mode is used, and the HARQ mapping field is used to indicate a HARQ process number corresponding to the uplink data.

6. A method comprising:
receiving, by a terminal, mode configuration indication information sent by a network device, wherein the mode configuration indication information is used to indicate that a synchronous hybrid automatic repeat request (HARQ) mode and an asynchronous HARQ mode are configured for uplink transmission of the terminal on an unlicensed carrier;
performing, by the terminal according to the mode configuration indication information, uplink transmission on the unlicensed carrier using the synchronous HARQ mode or the asynchronous HARQ mode, wherein the performing includes retransmitting, by the terminal, uplink data using the asynchronous HARQ mode when a needed resource has not been obtained through contention, wherein the needed resource is a resource that is on the unlicensed carrier and that is needed when the uplink data is retransmitted according to the synchronous HARQ mode;
receiving, by the terminal, third indication information sent by the network device, wherein the third indication information is used to indicate that the network device has not obtained the needed resource through contention; and
determining, by the terminal according to the third indication information, that the needed resource has not been obtained through contention.

7. A method comprising:
receiving, by a terminal, mode configuration indication information sent by a network device, wherein the mode configuration indication information is used to indicate that a synchronous hybrid automatic repeat request (HARQ) mode and an asynchronous HARQ mode are configured for uplink transmission of the terminal on an unlicensed carrier; and
performing, by the terminal according to the mode configuration indication information, uplink transmission on the unlicensed carrier using the synchronous HARQ mode or the asynchronous HARQ mode, wherein the performing includes retransmitting, by the terminal, uplink data using the asynchronous HARQ mode when a needed resource has not been obtained through contention, wherein the needed resource is a resource that is on the unlicensed carrier and that is needed when the uplink data is retransmitted according to the synchronous HARQ mode;
wherein the retransmitting uplink data using the asynchronous HARQ mode when a needed resource has not been obtained through contention comprises:
retransmitting, by the terminal, the uplink data using the asynchronous HARQ mode when a percentage, in the needed resource, of a part that has not been obtained through contention in the needed resource exceeds a threshold; and
the method further comprises:
retransmitting, by the terminal, the uplink data using the synchronous HARQ mode when the percentage, in the needed resource, of the part that has not been obtained through contention in the needed resource is less than the threshold.

8. The method according to claim 7, wherein the retransmitting the uplink data using the synchronous HARQ mode when the percentage, in the needed resource, of the part that has not been obtained through contention in the needed resource is less than the threshold comprises:
performing, by the terminal, puncturing processing on the uplink data according to the part that has not been obtained through contention in the needed resource, when the percentage, in the needed resource, of the part that has not been obtained through contention in the needed resource is less than the threshold.

9. A method comprising:
determining, by a network device, to configure a synchronous hybrid automatic repeat request (HARQ) mode and an asynchronous HARQ mode for uplink transmission of a terminal on an unlicensed carrier;
sending, by the network device, mode configuration indication information to the terminal, wherein the mode configuration indication information is used to indicate that the synchronous HARQ mode and the asynchronous HARQ mode are configured for uplink transmission on the unlicensed carrier, to enable the terminal to preform uplink transmission on the unlicensed carrier using the synchronous HARQ mode or the asynchronous HARQ mode; and
determining, by the network device using the asynchronous HARQ mode, to receive uplink data that is retransmitted by the terminal on the unlicensed carrier;
wherein the determining includes:
receiving, by the network device, first indication information sent by the terminal, wherein the first indication information is used to indicate that the terminal retransmits the uplink data by using the asynchronous HARQ mode; and
determining, by the network device using the asynchronous HARQ mode, according to the first indication information, to receive the uplink data that is retransmitted by the terminal on the unlicensed carrier.

10. The method according to claim 9, wherein the sending mode configuration indication information to the terminal comprises:
sending, by the network device, a system message to the terminal, wherein the system message carries the mode configuration indication information; or
sending, by the network device, radio resource control (RRC) signaling to the terminal, wherein the RRC signaling carries the mode configuration indication information; or
sending, by the network device, downlink control information (DCI) to the terminal, wherein the DCI carries the mode configuration indication information.

11. A method comprising:
determining, by a network device, to configure a synchronous hybrid automatic repeat request (HARQ) mode and an asynchronous HARQ mode for uplink transmission of a terminal on an unlicensed carrier;
sending, by the network device, mode configuration indication information to the terminal, wherein the mode configuration indication information is used to indicate that the synchronous HARQ mode and the asynchronous HARQ mode are configured for uplink transmission on the unlicensed carrier, to enable the terminal to preform uplink transmission on the unlicensed carrier using the synchronous HARQ mode or the asynchronous HARQ mode; and
determining, by the network device using the asynchronous HARQ mode, to receive uplink data that is retransmitted by the terminal on the unlicensed carrier, wherein the determining to receive uplink data that is retransmitted by the terminal on the unlicensed carrier comprises:
determining, by the network device using the asynchronous HARQ mode, to receive the uplink data that is retransmitted by the terminal on the unlicensed carrier, when a needed resource has not been obtained through contention, wherein the needed resource is a resource that is on the unlicensed carrier and that is needed when the uplink data is retransmitted using the synchronous HARQ mode; and the method further comprises:

sending, by the network device, second indication information to the terminal, wherein the second indication information is used to instruct to retransmit the uplink data using the asynchronous HARQ mode.

12. A terminal, comprising:
a receiver;
a transmitter;
a processor; and
a memory,
wherein the receiver, the transmitter and the memory are coupled to the processor,
wherein the memory is configured to store computer executable instructions, and
wherein the receiver is configured to receive mode configuration indication information sent by a network device, wherein the mode configuration indication information is used to indicate that a synchronous hybrid automatic repeat request (HARQ) mode and an asynchronous HARQ mode are configured for uplink transmission of the terminal on an unlicensed carrier; and
wherein the processor is configured to perform uplink transmission on the unlicensed carrier using the synchronous HARQ mode or the asynchronous HARQ mode according to the mode configuration indication information;
wherein the processor is further configured to determine to retransmit the uplink data using the asynchronous HARQ mode, when the needed resource has not been obtained through contention; and
wherein the transmitter is configured to send first indication information to the network device, wherein the first indication information is used to indicate that the terminal retransmits the uplink data using the asynchronous HARQ mode.

13. The terminal according to claim 12, wherein the mode configuration indication information is further used to indicate mode switching between the synchronous HARQ mode and the asynchronous HARQ mode.

14. The terminal according to claim 12, wherein the receiver is further configured to:
receive a system message sent by the network device, wherein the system message carries the mode configuration indication information; or
receive radio resource control (RRC) signaling sent by the network device, wherein the RRC signaling carries the mode configuration indication information; or
receive downlink control information (DCI) sent by the network device, wherein the DCI carries the mode configuration indication information.

15. The terminal according to claim 12, wherein the transmitter is configured to retransmit uplink data using the asynchronous HARQ mode when a needed resource has not been obtained through contention, wherein the needed resource is a resource that is on the unlicensed carrier and that is needed when the uplink data is retransmitted according to the synchronous HARQ mode.

* * * * *